(12) United States Patent
Lee

(10) Patent No.: US 11,796,669 B2
(45) Date of Patent: Oct. 24, 2023

(54) MULTI-STREAM MIMO/BEAMFORMING RADAR

(71) Applicant: Aura Intelligent Systems, Inc., Boston, MA (US)

(72) Inventor: Jungah Lee, Boston, MA (US)

(73) Assignee: Aura Intelligent Systems, Inc., Boston, MA (US)

( * ) Notice: Subject to any disclaimer, the term of this patent is extended or adjusted under 35 U.S.C. 154(b) by 7 days.

(21) Appl. No.: 17/594,600

(22) PCT Filed: Apr. 24, 2020

(86) PCT No.: PCT/US2020/029924
§ 371 (c)(1),
(2) Date: Oct. 22, 2021

(87) PCT Pub. No.: WO2020/219954
PCT Pub. Date: Oct. 29, 2020

(65) Prior Publication Data
US 2022/0224380 A1    Jul. 14, 2022

Related U.S. Application Data

(60) Provisional application No. 62/845,606, filed on May 9, 2019, provisional application No. 62/838,168, filed on Apr. 24, 2019.

(51) Int. Cl.
*G01S 13/87* (2006.01)
*G01S 7/02* (2006.01)
(Continued)

(52) U.S. Cl.
CPC .......... *G01S 13/878* (2013.01); *G01S 7/0234* (2021.05); *G01S 13/325* (2013.01); *G01S 13/426* (2013.01);
(Continued)

(58) Field of Classification Search
CPC .... G01S 13/878; G01S 7/0234; G01S 13/325; G01S 13/931; G01S 7/023; H04B 7/0413;
(Continued)

(56) References Cited

U.S. PATENT DOCUMENTS 8,570,210 B1 * 10/2013 Fonder ................... G01S 13/02
                                                                  342/25 B
2007/0230600 A1   10/2007 Bertrand et al.
(Continued)

FOREIGN PATENT DOCUMENTS

CN    106797625 A    5/2017
CN    107888239 A    4/2018

OTHER PUBLICATIONS

Extended European Search Report dated Apr. 8, 2022 regarding Application No. 19819272.6, 12 pages.
(Continued)

*Primary Examiner* — Janice N Tieu

(57) ABSTRACT

An advanced system and method is provided. The advanced system and method comprises: a set of antennas including a set of transmit antennas and a set of receive antennas; a digital beamformer; and a processor operably connected to the set of antennas and the digital beamformer, the processor configured to; identify a set of orthogonal multiple-input-multiple-output (MIMO) signals, generate a first set of beams via the digital beamformer, and map the set of orthogonal MIMO signals into each of the generated set of beams. The advanced system and method further comprises a transceiver operably connected to the processor, the transceiver configured to: transmit, to a target scene via the set of transmit antenna of the set of antennas, a first signal based on the first set of beams; and receive, via the set of receive
(Continued)

antennas of the set of antennas, a second signal based on a second set of beams that is reflected or backscattered from the target scene.

18 Claims, 36 Drawing Sheets

(51) Int. Cl.
  *G01S 13/32* (2006.01)
  *H04B 7/0413* (2017.01)
  *H04B 7/06* (2006.01)
  *G01S 13/42* (2006.01)
  *G01S 13/931* (2020.01)

(52) U.S. Cl.
  CPC .......... *G01S 13/931* (2013.01); *H04B 7/0413* (2013.01); *H04B 7/0617* (2013.01); *H04B 7/0682* (2013.01); *H04B 7/0695* (2013.01); *G01S 7/023* (2013.01)

(58) Field of Classification Search
  CPC ................ H04B 7/0617; H04B 7/0682; H04B 7/0695
  See application file for complete search history.

(56) References Cited

U.S. PATENT DOCUMENTS

| | | | |
|---|---|---|---|
| 2008/0151813 A1* | 6/2008 | Xing | H04J 3/0682 370/324 |
| 2014/0187174 A1 | 7/2014 | Safavi et al. | |
| 2014/0205035 A1 | 7/2014 | Ko et al. | |
| 2015/0381396 A1* | 12/2015 | Chen | H04L 41/0803 370/254 |
| 2016/0116582 A1 | 4/2016 | Chang | |

OTHER PUBLICATIONS

Paul et al., "Survey of RF Communications and Sensing Convergence Research", IEEE Access, vol. 5, Jan. 2017, pp. 252-270.
Gutiérrez Del Arroyo et al., "SAR Imaging Using WiMAX OFDM PHY", 2011 IEEE RadarCon (RADAR), May 2011, pp. 129-134.
"Passive Coherent Locator Applications", STO-EN-SET-2443, Aug. 2017, 16 pages.
Samsung, "NR PRACH design", 3GPP TSG RAN WG1 #89, R1-1707932, May 2017, 13 pages.
Samsung, "RACH preamble design for NR", 3GPP TSG RAN WG1 #86 bis, R1-1609119, Oct. 2016, 3 pages.
NTT Docomo et al., "Orthogonal Pilot Channel in the Same Node B in Evolved UTRA Uplink", TSG-RAN WG1 #42bis, R1-051142, Oct. 2005, 9 pages.
International Search Report and Written Opinion regarding International Application No. PCT/US2020/029924, dated Jul. 21, 2020, 16 pages.
Extended European Search Report issued Dec. 8, 2022 regarding Application No. 20794794.6, 10 pages.
Chinese National Intellectual Property Administration, Notification To Grant Patent Right For Invention dated Jul. 27, 2023 regarding Application No. 2020800463275, 7 pages.
European Patent Office, Communication pursuant to Article 94(3) EPC dated Aug. 23, 2023 regarding Application No. 207947946, 7 pages.
Rahman et al., "Framework for a Perceptive Mobile Network Using Joint Communication and Radar Sensing", IEEE Transactions on Aerospace and Electronic Systems, vol. 56, No. 3, Jan. 2019, 14 pages.
Duong et al., "Editorial: Wireless Communications and Networks for 5G and Beyond", Mobile Networks and Applications, vol. 24, No. 2, Feb. 2019, pp. 443-446.
Petrov et al., "On United Vehicular Communications and Radar Sensing in Millimeter-Wave and Low Terahenz Bands", IEEE Wireless Communications, vol. 26, No. 3, Jan. 2019, 8 pages.

* cited by examiner $\psi_{mn}=nkd_z\sin\theta + mkL_z\sin\varphi, n=0,\ldots,N-1, m=0,1; k=\frac{2\pi}{\lambda}$ $\alpha_{mn}$: APODIZATION FACTOR

MULTI-STREAM MIMO/BEAMFORMING RADAR

CROSS-REFERENCE TO RELATED APPLICATIONS AND CLAIM OF PRIORITY

This application is a 371 National Stage Application of International Application No. PCT/US2020/029924 filed on Apr. 24, 2020, which claims priority to U.S. Provisional Patent Application No. 62/838,168, filed on Apr. 24, 2019, and U.S. Provisional Patent Application No. 62/845,606, filed on May 9, 2019, the disclosures of which are herein incorporated by reference in their entirety.

TECHNICAL FIELD

This disclosure generally relates to radar system technologies. More specifically, this disclosure relates to a multi-stream MIMO/beamforming radar in next generation radar systems.

BACKGROUND

In high-resolution radar such as in automotive applications, a number of hyper-voxels of a 4-D sphere is large, while a measurement time is limited due to the required frame rate. Phased array beamforming with analog beamformer has limited frame rate due to a number of simultaneous beams that can be generated and a number of signals that can be transmitted simultaneously.

SUMMARY

In the present disclosure, multi-stream transmission and reception schemes are provided for high-resolution radar. The present disclosure provides sub-band coded OFDM for high-resolution radar. The present disclosure allows a transmission and reception of the signal in multiple beams in beamforming mode, or multiple antennas in MIMO mode, without interference between the beams or antennas. The provided embodiments reduce the acquisition time by M×N fold, where M is a number of transmit beams (or MIMO layers) and N is a number of receive beams (or MIMO layers).

In one embodiment, an advanced system is provided. The advanced system comprises: a set of antennas including a set of transmit antennas and a set of receive antennas; a digital beamformer; a processor operably connected to the set of antennas and the digital beamformer, the processor configured to: identify a set of orthogonal multiple-input-multiple-output (MIMO) signals, generate a first set of beams via the digital beamformer, and map the set of orthogonal MIMO signals into each of the generated set of beams. The advanced system further comprises a transceiver operably connected to the processor, the transceiver configured to: transmit, to a target scene via the set of transmit antenna of the set of antennas, a first signal based on the first set of beams; and receive, via the set of receive antennas of the set of antennas, a second signal based on a second set of beams that is reflected or backscattered from the target scene.

In another embodiment, a method of an advanced system is provided. The method comprises: identifying a set of orthogonal multiple-input-multiple-output (MIMO) signals; generating a first set of beams; mapping the set of orthogonal MIMO signals into each of the generated set of beams; transmitting, to a target scene, a first signal based on the first set of beams; and receiving a second signal based on a second set of beams that is reflected or backscattered from the target scene.

In yet another embodiment, a non-transitory computer-readable medium is provided. The non-transitory computer-readable medium comprises program code, that when executed by at least one processor, causes an advanced system to: identify a set of orthogonal multiple-input-multiple-output (MIMO) signals; generate a first set of beams; map the set of orthogonal MIMO signals into each of the generated set of beams; transmit, to a target scene, a first signal based on the first set of beams; and receive a second signal based on a second set of beams that is reflected or backscattered from the target scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 14, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1:
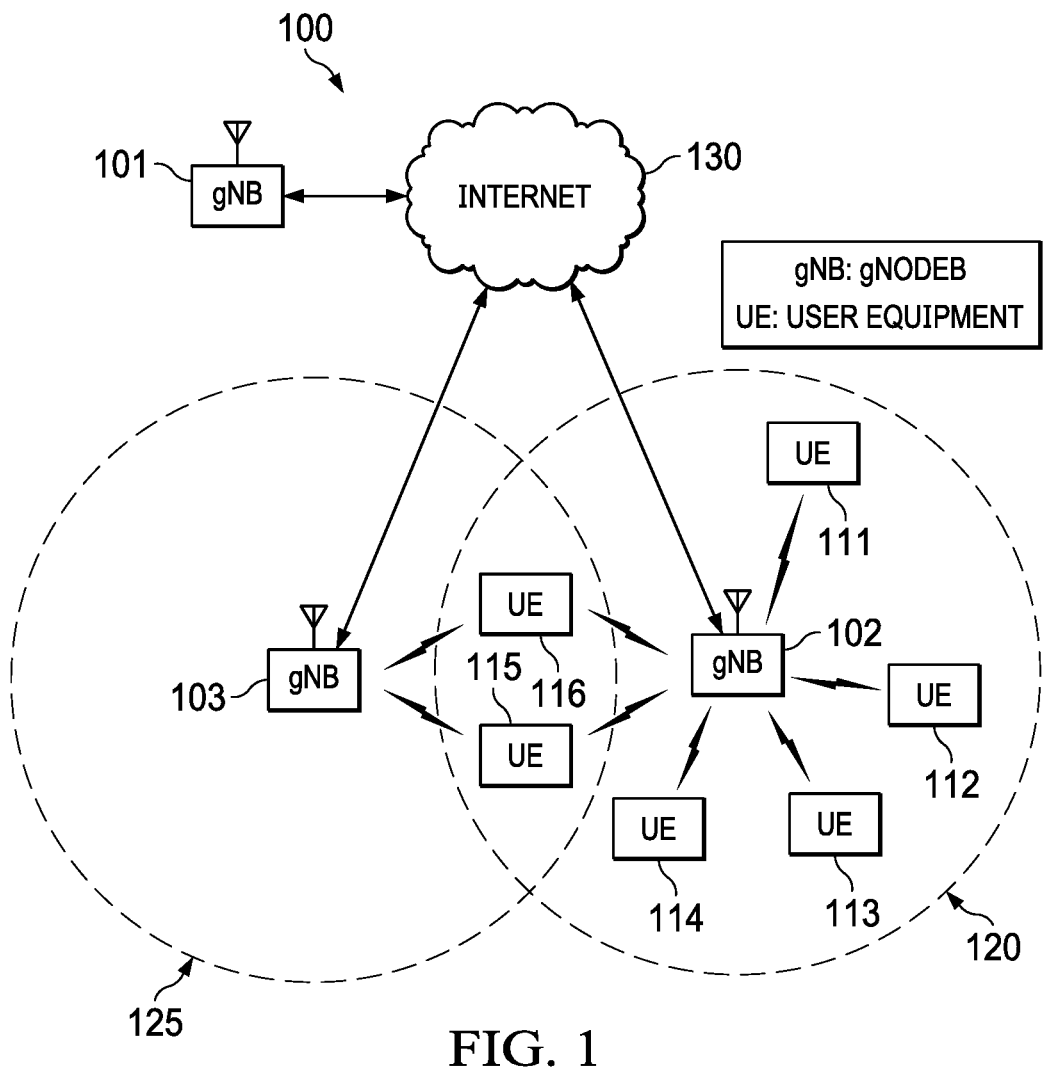
FIG. 1 illustrates an example wireless network according to embodiments of the present disclosure.
Figure 2:
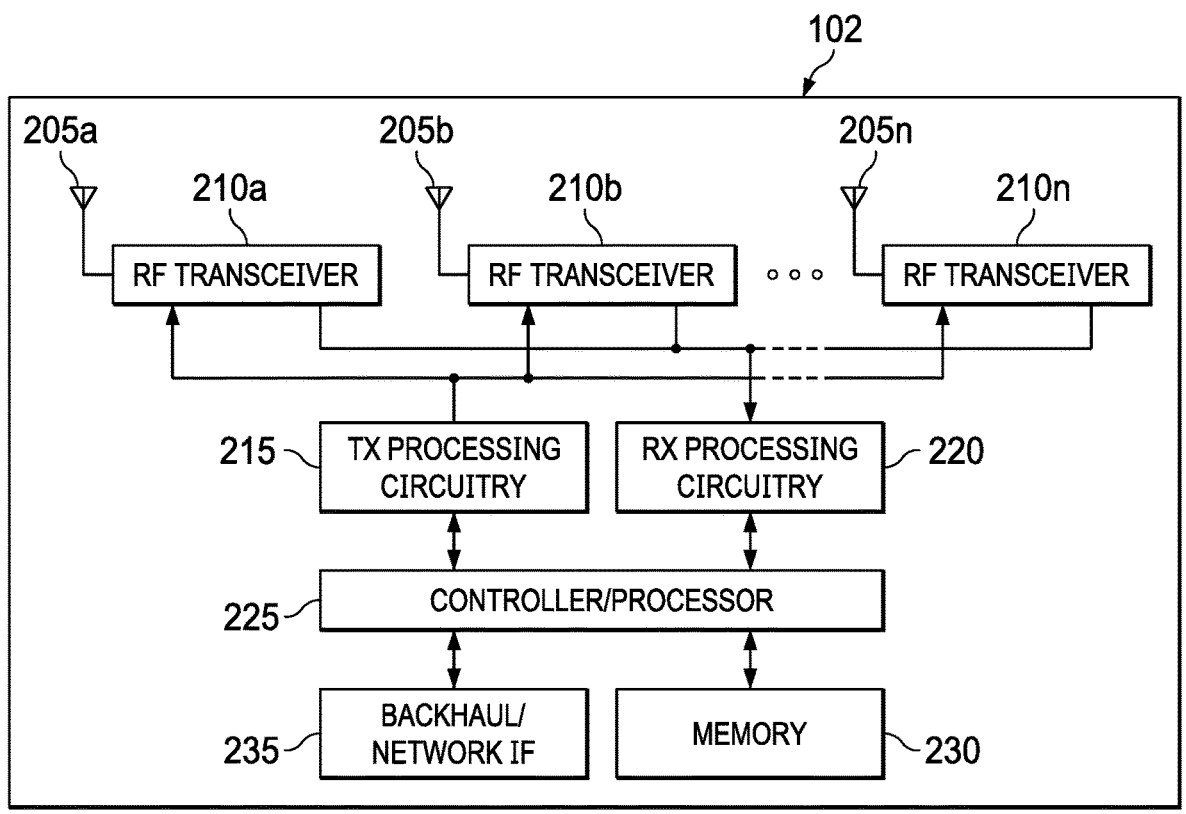
FIG. 2 illustrates an example gNB according to embodiments of the present disclosure.
Figure 3:
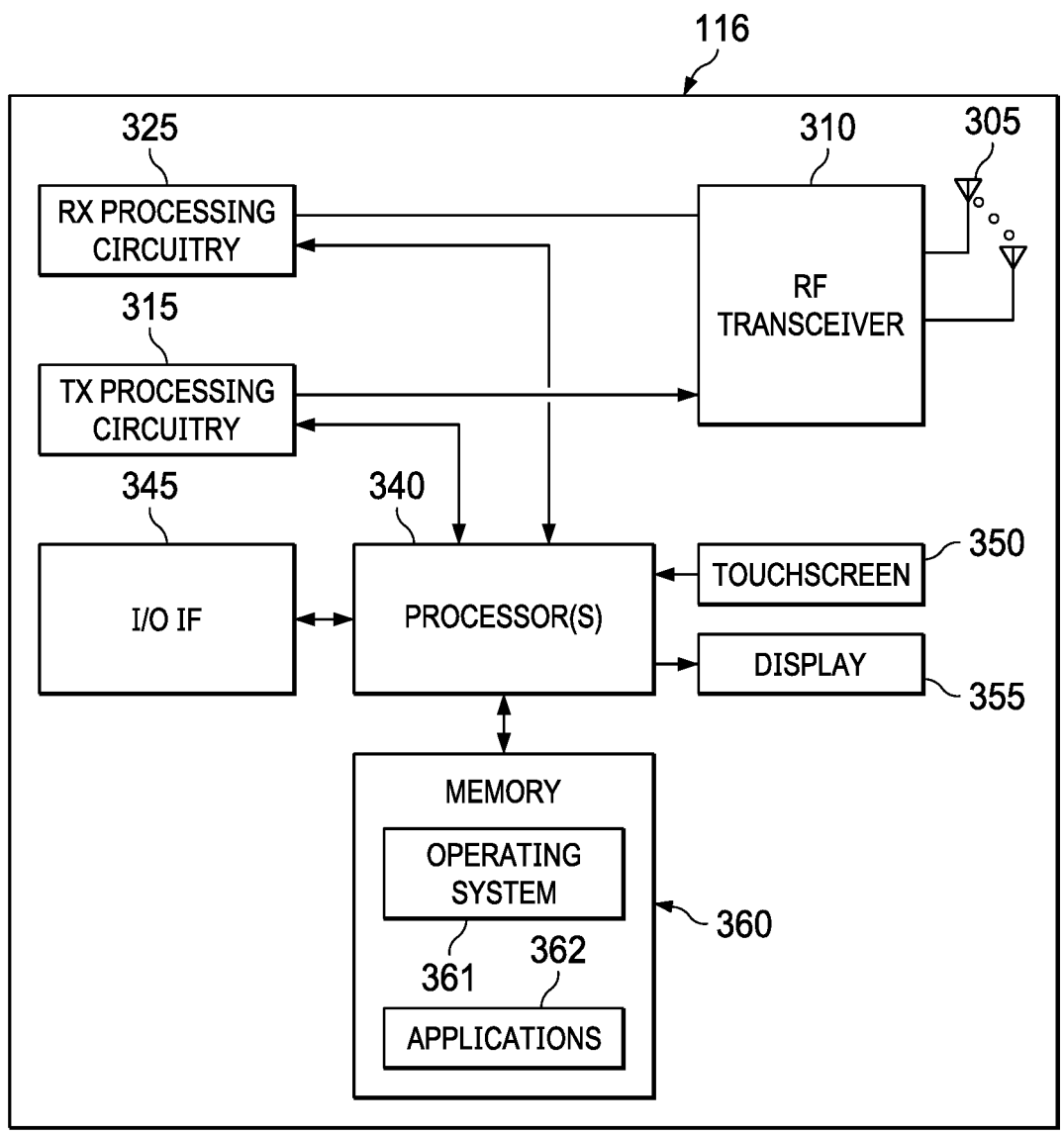
FIG. 3 illustrates an example UE according to embodiments of the present disclosure.

FIGS. 1 through 3 describe various embodiments implemented in wireless communications systems and with the use of orthogonal frequency division multiplexing (OFDM) or orthogonal frequency division multiple access (OFDMA) communication techniques. The descriptions of FIGS. 1 through 3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In one embodiment, such gNBs 101-103 may be implemented as an advanced system including a radar system supporting multi-stream MIMO and/or beamforming radar.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques. In one embodiment, such UEs 111-111 may be implemented as an advanced system including a radar system supporting multi-stream MIMO and/or beamforming radar.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of conve- nience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient synthetic aperture antenna array design and beamforming for 3D imaging, localization, and positioning in an advanced wireless system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The RF transceivers 210a-210n receive, from the antennas 205a-205n, incoming RF signals, such as signals reflected by UEs or any other objects in the network 100. The RF transceivers 210a-210n down-convert the incoming RF signals to generate IF or baseband signals. The IF or baseband signals are sent to the RX processing circuitry 220, which generates processed baseband signals by filtering, decoding, digitizing the baseband or IF signals and/or decompressing or correlating. The RX processing circuitry 220 sends the processed baseband signals to the controller/processor 225 for further processing.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, the ground station (e.g., access point) could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

Figure 14:
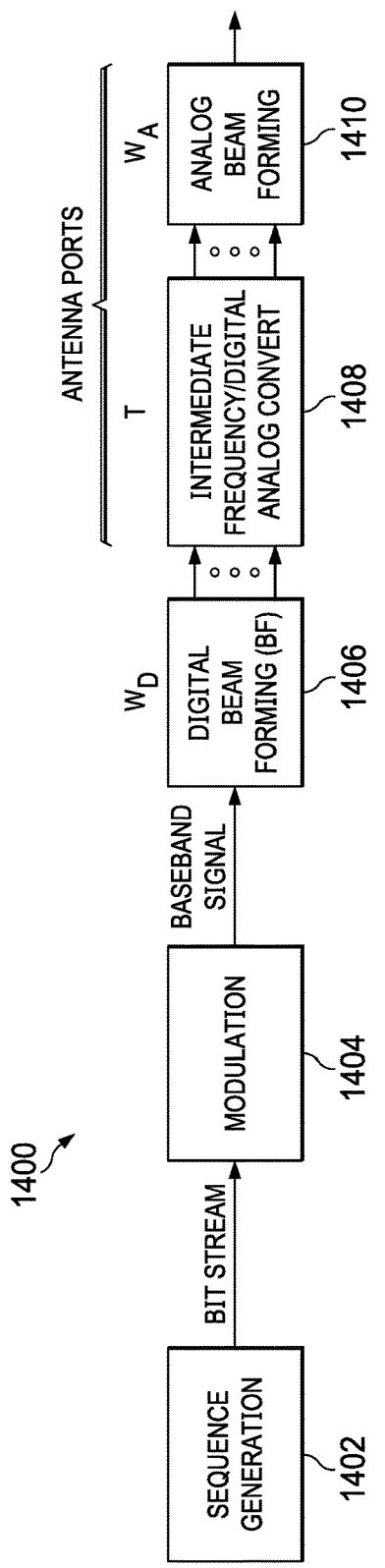
FIG. 14 illustrates an example hybrid beamforming general architecture in accordance with the present disclosure.
Figure 15:
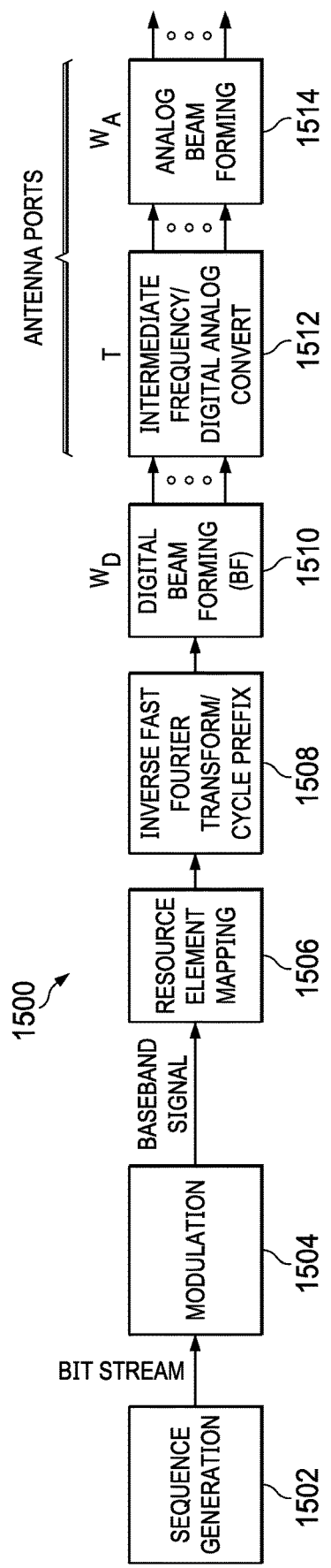
FIG. 15 illustrates an example hybrid beamforming with OFDM waveform in accordance with the present disclosure.
Figure 16:
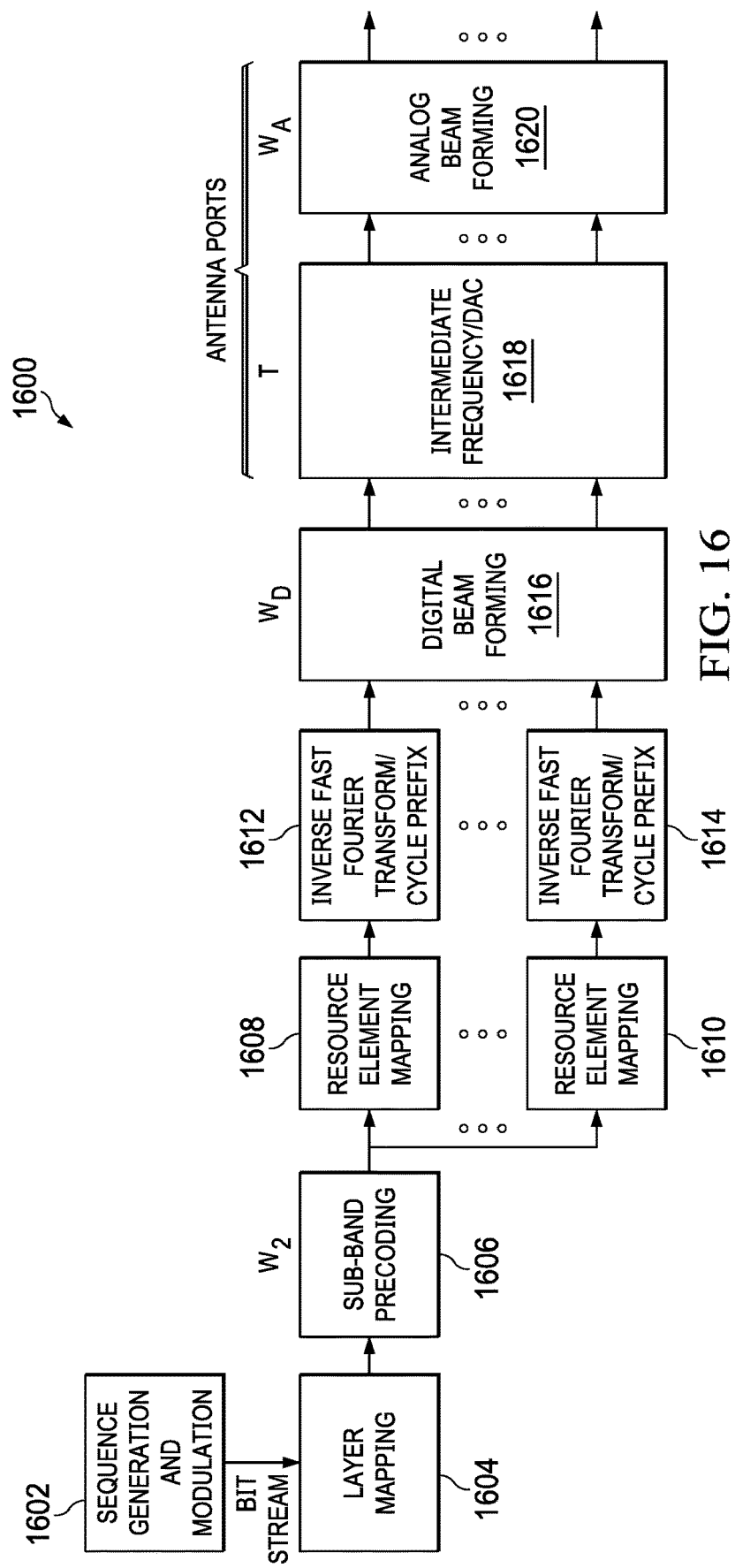
FIG. 16 illustrates an example hybrid beamforming with MIMO OFDM waveform in accordance with the present disclosure.

An advanced communication apparatus may refer to a transmitter or receiver array in FIGS. 14, 15, and 16 providing hybrid beamforming operation based on all functional blocks, and may be implemented in FIG. 2 as a part of a base station (BS, gNB) or FIG. 3 as a UE.

As shown in FIG. 3, the UE 116 includes an antenna 305, a radio frequency (RF) transceiver 310, TX processing circuitry 315, and receive (RX) processing circuitry 325. The UE 116 also includes a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal and/or decompressing or correlating. The RX processing circuitry 325 transmits the processed baseband signal to the processor 340 for further processing (such as for web browsing data).

The TX processing circuitry 315 receives outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

It is well known that despite its simplicity, code division multiple access (CDMA) system suffers interference and multi-path dispersion.

Benefit of orthogonal frequency division multiplexing (OFDM) over frequency modulated continuous-wave (FMCW) radars is well understood: the waveform is simple to generate, reducing the transceiver complexity compared with FMCW and Chirp sequence modulation; waveform does not require linear frequency generation in hardware; unlike phase modulated signals, which are susceptible to self-interference and multi-path interference, OFDM waveform does not have stringent phase noise requirements, nor does it suffer from multi-path interference; and OFDM is ideally suited for MIMO processing.

Despite the benefits, OFDM signal generation and processing for a high-resolution radar is challenging due to the wide bandwidth processing required for high-resolution radars. Automotive radars in 76 GHz-81 GHz has signal bandwidth of 1 GHz to 5 GHz, requiring analog-to-digital converting (ADC) rate exceeding 10 Gsps with large number of bits. For 3D radar imaging requiring 10's to 100's channels, wideband OFDM radar systems are cost prohibitive. As such, commercially available radar transceivers rely on FMCW signal.

Figure 4:
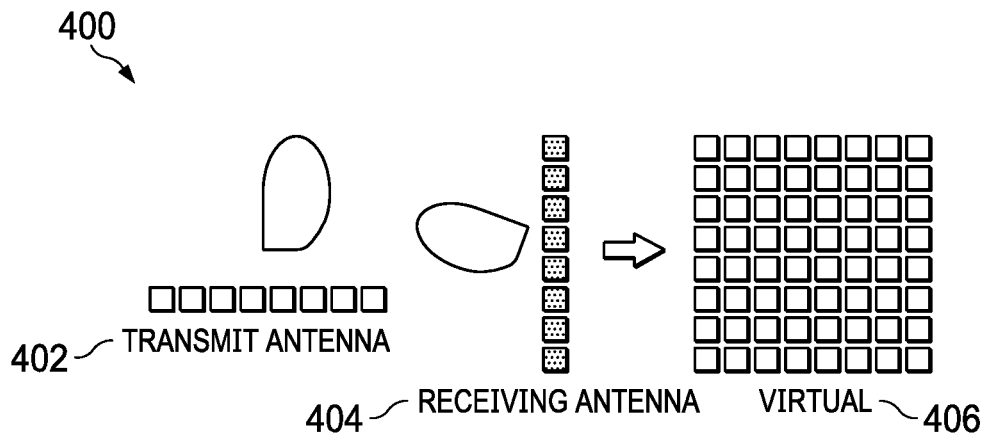
FIG. 4 illustrates an example 2D virtual antenna array for imaging in accordance with the present disclosure.

FIG. 4 illustrates an example 2D virtual antenna array for imaging 400 in accordance with the present disclosure. An embodiment of the 2D virtual antenna array for imaging 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

FIG. 4 illustrates an example two dimensional (2D) virtual antenna array for imaging in accordance with the present disclosure. As illustrated in FIG. 4, a 2D virtual antenna array for imaging includes a transmit (Tx) antenna 402 and a receive (Rx) antenna 404. At a transmitter, Azimuth beamforming with one dimensional (1D) linear array is performed and a sequential scanning is performed in Azimuth. At a receiver, a vertical beamforming for vertical resolution is performed. As illustrated in FIG. 4, 64 channel angles of arrival (AoA) antennas are provided. In one embodiment, a 2D virtual antenna array can use a MIMO antenna array (e.g., 2/4/8 orthogonal channels). As discussed above, a 2D virtual antenna array may have benefits: reduction from $N^2$ paths to 2N paths (e.g., small number of ADC/DAC and lower power consumption in transceiver); antenna size reduction and antenna design; and associated reduction in circuitry for DAC/ADC, IF and power consumption. The virtual antenna 406 may show the Tx antenna 402 and the Rx antenna 404.

Figure 5:
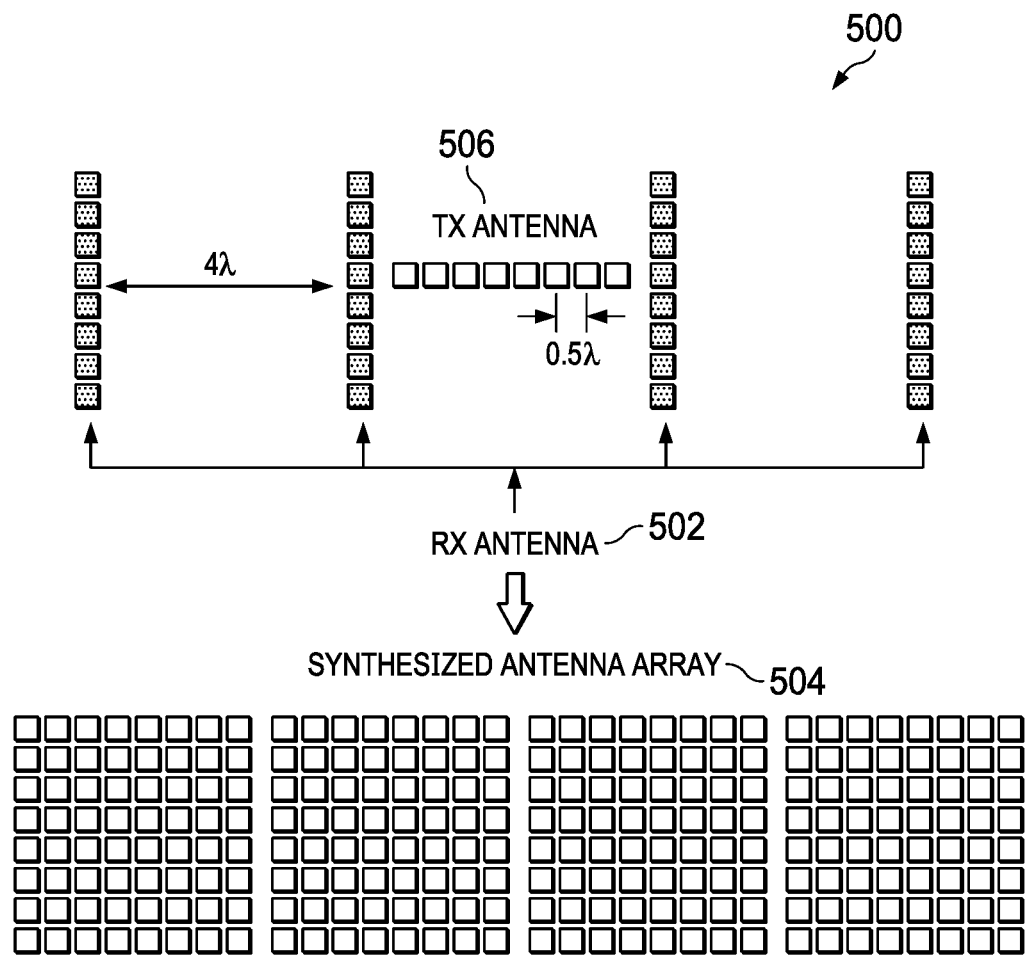
FIG. 5 illustrates an example synthesizing larger aperture in Azimuth in accordance with the present disclosure.

FIG. 5 illustrates an example synthesizing larger aperture in Azimuth 500 in accordance with the present disclosure. An embodiment of the synthesizing larger aperture in Azimuth 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure. As shown in FIG. 5, the synthesizing larger aperture in Azimuth 500 includes Rx antenna 502 and synthesized antenna array 504.

Figure 6:
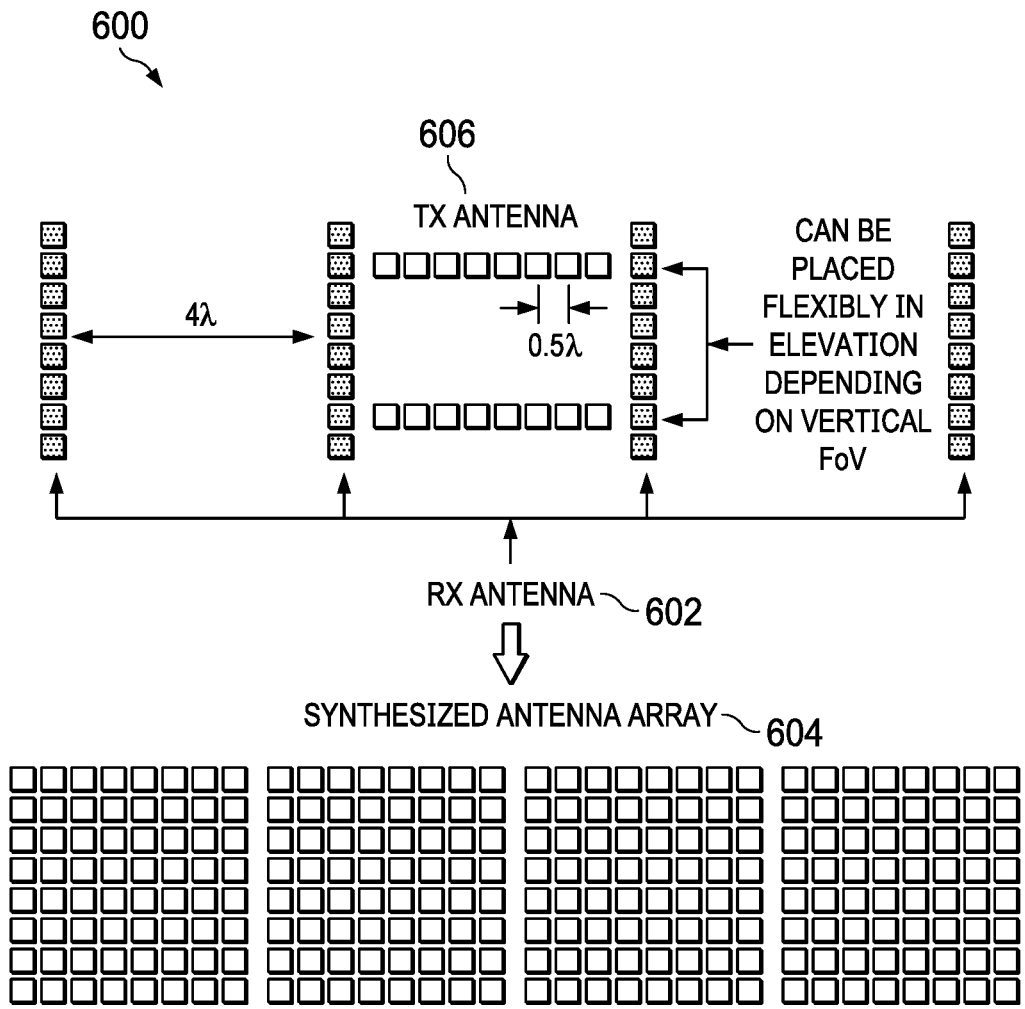
FIG. 6 illustrates another example synthesizing larger aperture in Azimuth in accordance with the present disclosure.

FIG. 6 illustrates another example synthesizing larger aperture in Azimuth 600 in accordance with the present disclosure. An embodiment of the synthesizing larger aperture in Azimuth 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure. As shown in FIG. 6, the synthesizing larger aperture in Azimuth 600 includes Rx antenna 602 and synthesized antenna array 604

FIGS. 5 and 6 illustrate an example synthesizing larger aperture in Azimuth in accordance with the present disclosure. As illustrated in FIG. 5, a number of transmit paths is reduced from $M^2N$ to M+MN (M: antenna array size, N: number of Rx antenna columns). For example, for M=8, N=4, 320 paths are reduced to 40 paths (Saving by 88%) and for M=8, N=8, 512 paths are reduced to 72 paths (Saving by 86%). As illustrated in FIG. 5, the Rx antenna 502 and the Tx antenna 506 may be synthesized into the synthesized antenna array 504.

FIG. 6 illustrates synthesizing larger aperture in Azimuth that may provide adjustable vertical field of view. As illustrated in FIG. 6, the Rx antenna 602 and the Tx antenna 606 may be synthesized into the synthesized antenna array 604.

Figure 7:
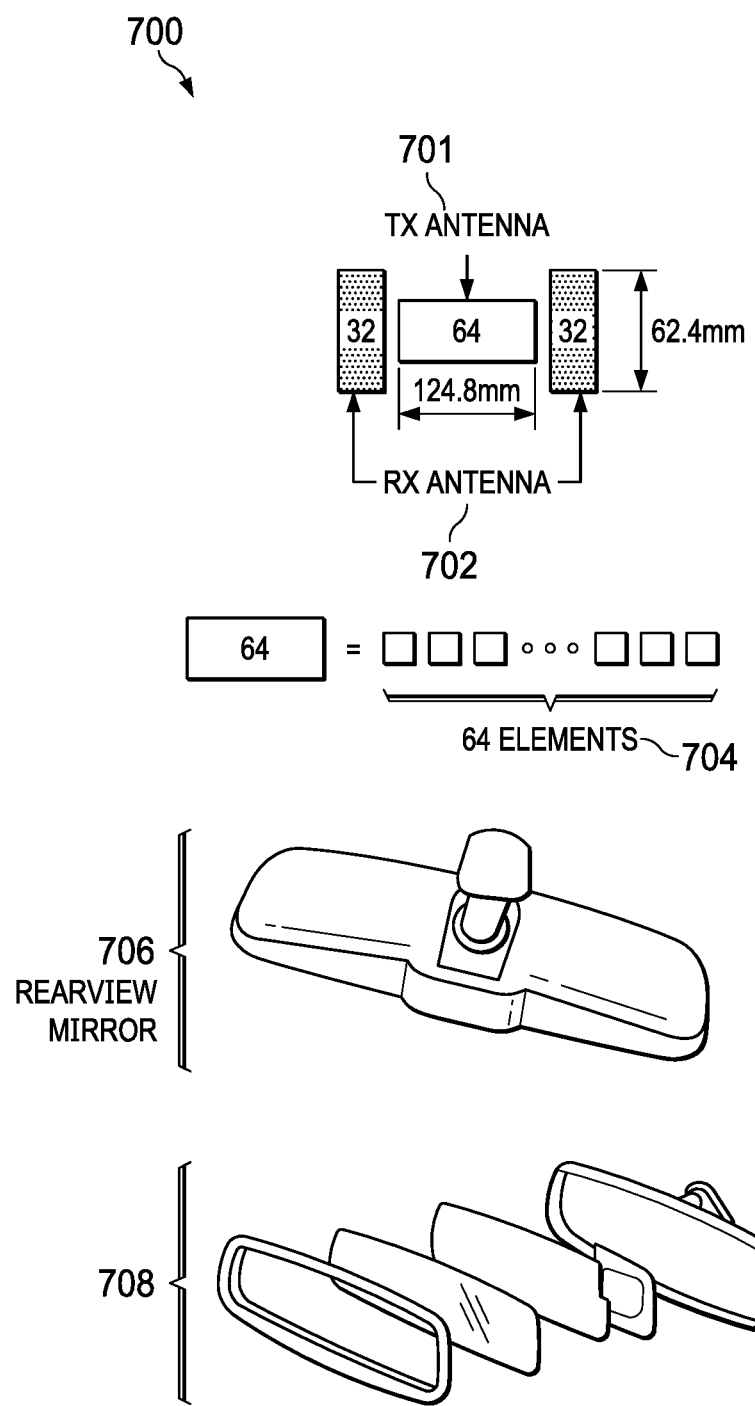
FIG. 7 illustrates an example automotive antenna design in accordance with the present disclosure.

FIG. 7 illustrates an example automotive antenna design 700 in accordance with the present disclosure. An embodiment of the automotive antenna design 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure. As shown in FIG. 7, the automotive antenna design 700 includes Tx antenna 701 and Rx antenna 702.

Figure 8:
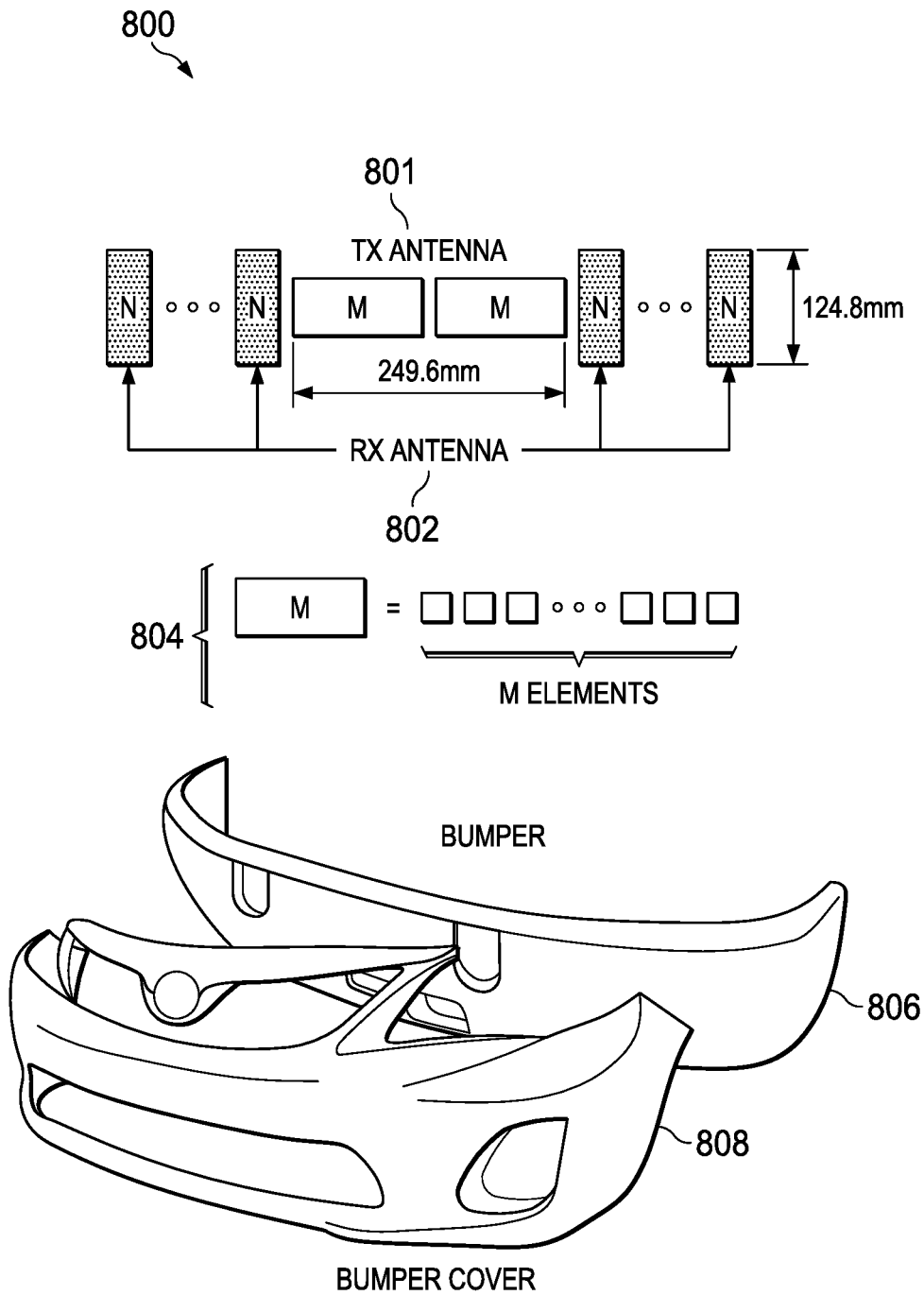
FIG. 8 illustrates another example automotive antenna design in accordance with the present disclosure.

FIG. 8 illustrate another example automotive antenna design 800 in accordance with the present disclosure. An embodiment of the automotive antenna design 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

FIGS. 7 and 8 illustrate an example automotive antenna design in accordance with the present disclosure.

As illustrated in FIG. 7, a 64×32 virtual array is shown for an automotive antenna design, for example, at 77 GHz. As illustrated in FIG. 7, the 64×32 virtual array includes an antenna panel for Tx comprising 64 elements in Azimuth and 64 element arrays in elevation, and 8 vertical arrays for Rx. As illustrated in FIG. 7, Tx antenna 701 and Rx antenna 702 may be arranged to 64 elements 704. As illustrated in FIG. 7, the rearview mirror 706 may install the 64 elements 704. The rearview mirror may be composed of each layer 708.

As illustrated in FIG. 8, a 1024×64 virtual array is shown for an automotive antenna design, for example, at 77 GHz. As illustrated in FIG. 8, the 1024×64 virtual array includes an antenna panel for Tx comprising 128 elements in Azimuth and 64 element arrays in elevation, and 8 vertical arrays for Rx comprising 64 elements in elevation. The 1024×64 virtual array as illustrated in FIG. 8 can be extended to include two or more Tx antenna arrays (rows) for adjustable vertical angle of departure.

As illustrated in FIG. 8, Tx antenna 801 and Rx antenna 802 may be arranged to M elements 804. As illustrated in FIG. 8, the car bumper 806 with the bumper cover 808 may install the M elements 804.

Figure 9:
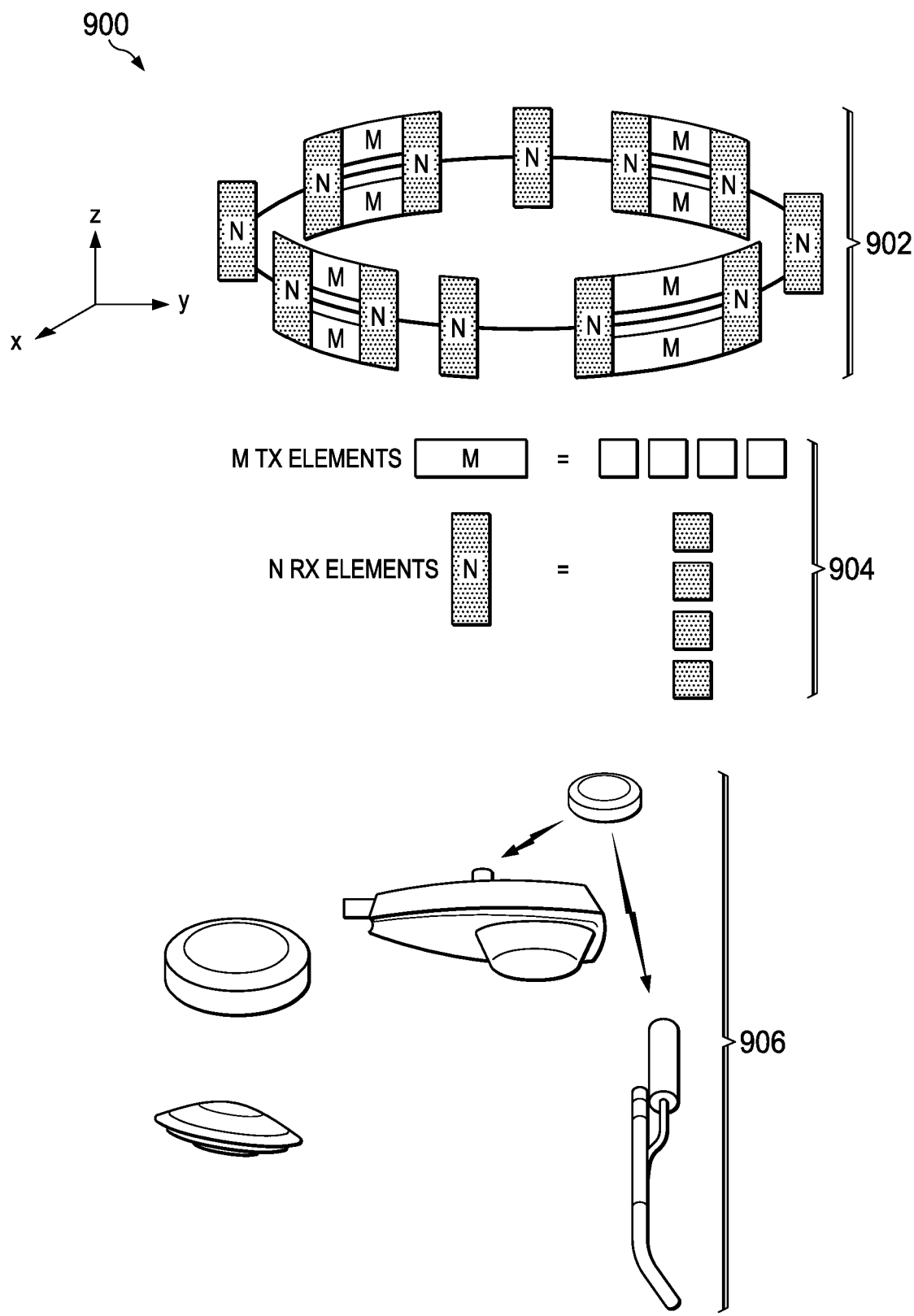
FIG. 9 illustrates an example virtual 2D circular antenna array in accordance with the present disclosure.

FIG. 9 illustrates an example virtual 2D circular antenna array 900 in accordance with the present disclosure. An embodiment of the virtual 2D circular antenna array 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

FIG. 9 illustrates an example virtual 2D circular antenna array in accordance with the present disclosure. As illustrated in FIG. 9, a pole, a lamp post, and a rooftop installation can be achieved for 360-degree coverage. As illustrated in FIG. 9, the circular antenna array 902 comprises M Tx elements and N Rx elements 904. The circular antenna array 902 may be configured in the pole and lamp post 906.

Figure 10:
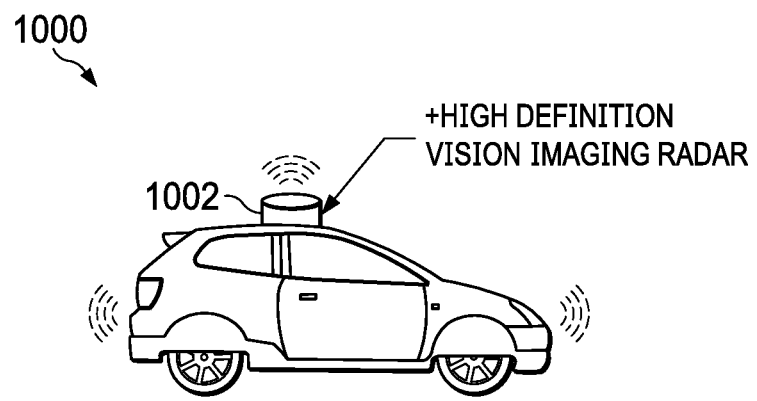
FIG. 10 illustrates an example automotive installation of imaging radar in accordance with the present disclosure.

FIG. 10 illustrates an example automotive installation of imaging radar 1000 in accordance with the present disclosure. An embodiment of the automotive installation of imaging radar 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

FIG. 10 illustrates an example automotive installation of imaging radar in accordance with the present disclosure. As illustrated in FIG. 10, multiple options for installing imaging radar can be provided for an automotive object 1002.

Figure 11:
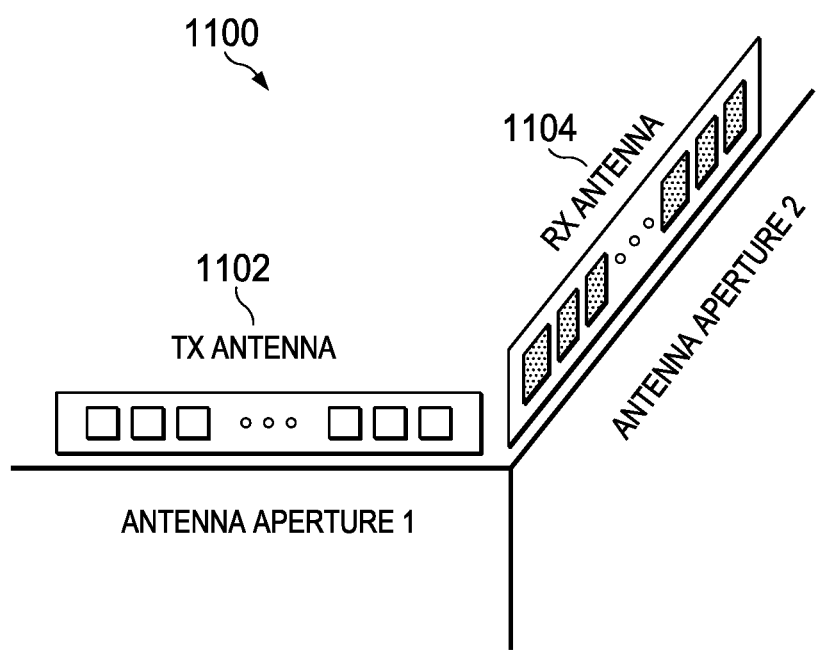
FIG. 11 illustrates an example in-building installation and factory automation in accordance with the present disclosure.

FIG. 11 illustrates an example in-building installation and factory automation 1100 in accordance with the present disclosure. An embodiment of the in-building installation and factory automation 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

Figure 12:
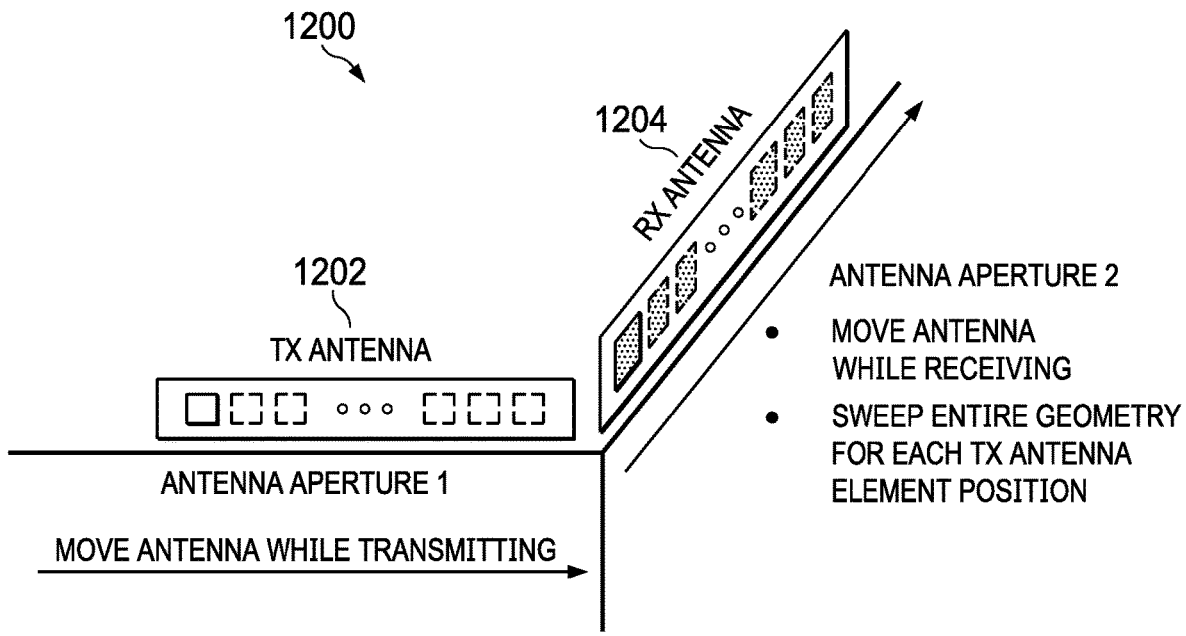
FIG. 12 illustrates another example in-building installation and factory automation in accordance with the present disclosure.

FIG. 12 illustrates another example in-building installation and factory automation 1200 in accordance with the present disclosure. An embodiment of the in-building installation and factory automation 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11, antennas can be installed along 2 corners for in-building installation and factory automation. As illustrated in FIG. 8, a transmission is performed using a transmit (Tx) antenna 1102 comprising antenna aperture 1 and a reception is performed using a receive (Rx) antenna 1104 comprising antenna aperture 2. In one embodiment, a transmission is performed using a transmit (Tx) antenna comprising antenna aperture 2 and a reception is performed using a receive (Rx) antenna comprising antenna aperture 1 (e.g., vice versa).

As illustrated in FIG. 12, one antenna element per aperture can be implemented. In one embodiment, antenna element in aperture 1 moves along x-axis (e.g., Tx antenna 1202) while transmitting the signal illuminating the objects in the room. In such embodiment, signal for each antenna element is weighted according to beamforming equation given by the present disclosure.

In one embodiment, for each antenna element location in aperture 1, antenna element in aperture 2 moves along y-axis (e.g., Rx antenna 1204) while receiving the signal reflected from the target. In such embodiment, signal for each antenna element is weighted according to beamforming equation given by the present disclosure.

Figure 13:
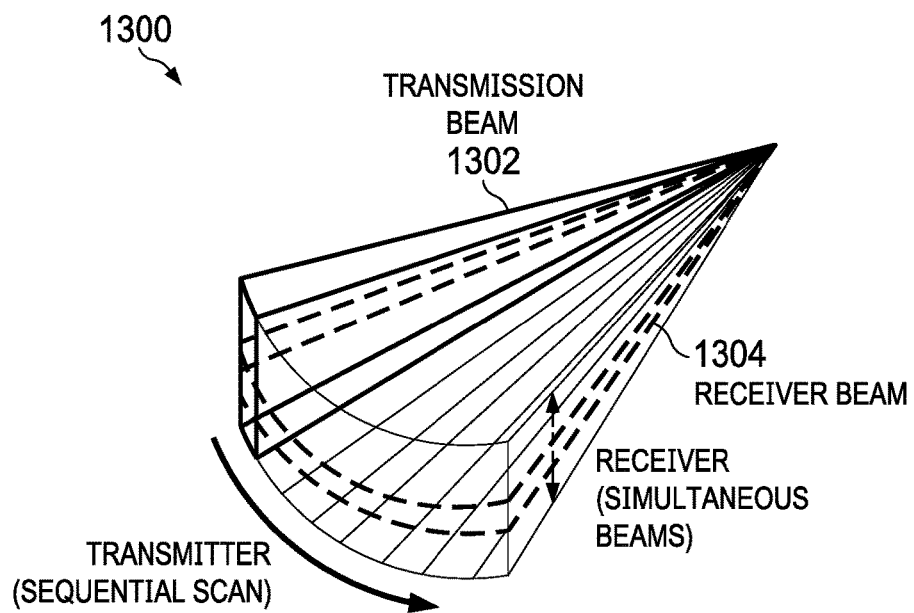
FIG. 13 illustrates an example beamformer illumination principle in accordance with the present disclosure.

FIG. 13 illustrates an example beamformer illumination principle 1300 in accordance with the present disclosure. An embodiment of the beamformer illumination principle 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 13, transmission beams 1302 are illuminated at a transmitter in sequential scan fashion and receive beams 1304 are simultaneously illuminated at a receiver.

FIG. 14 illustrates an example hybrid beamforming general architecture 1400 in accordance with the present disclosure. An embodiment of the hybrid beamforming general architecture 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 14, the hybrid beamforming general architecture 1400 may be implemented as an advanced system or the hybrid beamforming general architecture 1400 may be implemented as one of components of the advanced system.

As illustrated in FIG. 14, a hybrid beamformer circuit comprises a sequence generation block 1402, a modulation block 1404, a digital BF block 1406, an IF/DAC block 1408, and an analog BF block 1410. As illustrated in FIG. 14, a sub-band precoding ($W_2$) and a wideband precoding ($W_1$)

are determined. In such case, the wideband precoding ($W_1$) is divided into two parts as provided by:

$$W_1 W_D T W_A$$

$W_A$: Analog beamforming within antenna sub-array
$W_D$: Digital beamforming matrix among sub-array T: D/A, IF/RF FIG. 15 illustrates an example hybrid beamforming with OFDM waveform 1500 in accordance with the present disclosure. An embodiment of the hybrid beamforming with OFDM waveform 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15, the hybrid beamforming with OFDM waveform 1500 may be implemented as an advanced system or the hybrid beamforming with OFDM waveform 1500 may be implemented as one of components of the advanced system.

As illustrated in FIG. 15, a hybrid beamformer circuit with OFDM waveform comprises a sequence generation block 1502, a modulation block 1504, an RE mapping block 1506, an IFFT/CP block 1508, a digital BF block 1510, an IF/DAC block 1512, and an analog BF block 1514. As illustrated in FIG. 15, a sub-band precoding ($W_2$) and a wideband precoding ($W_1$) are determined. In such case, the wideband precoding ($W_1$) is divided into two parts as provided by:

$$W_1 = W_D T W_A$$

$W_A$: Analog beamforming within antenna sub-array
$W_D$: Digital beamforming matrix among sub-array T: D/A, IF/RF FIG. 16 illustrates an example hybrid beamforming with MIMO OFDM waveform 1600 in accordance with the present disclosure. An embodiment of the hybrid beamforming with MIMO OFDM waveform 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, the hybrid beamforming with MIMO OFDM waveform 1600 may be implemented as an advanced system or the hybrid beamforming with MIMO OFDM waveform 1600 may be implemented as one of components of the advanced system.

As illustrated in FIG. 16, a hybrid beamformer circuit with OFDM waveform 1600 comprises a sequence generation block 1602, a layer mapping block 1604, a sub-band precoding block 1606, a set of resource element mapping blocks 1608, 1610, a set of IFFT/CP blocks 1612, 1614, a digital BF block 1610, an IF/DAC block 1618, and an analog BF block 1620.

As illustrated in FIG. 16, a hybrid beamformer circuit with MIMO OFDM waveform comprises a sequence generation and modulation block, a layer mapping block, a sub-band precoding block, a plurality of RE mapping blocks, a plurality of IFFT/CP blocks, a digital BF block, an IF/DAC block, and an analog BF block. As illustrated in FIG. 13, a sub-band precoding ($W_2$) and a wideband precoding ($W_1$) are determined. In such case, the wideband precoding ($W_1$) is divided into two parts as provided by:

$$W_1 = W_D T W_A$$

Figure 17:
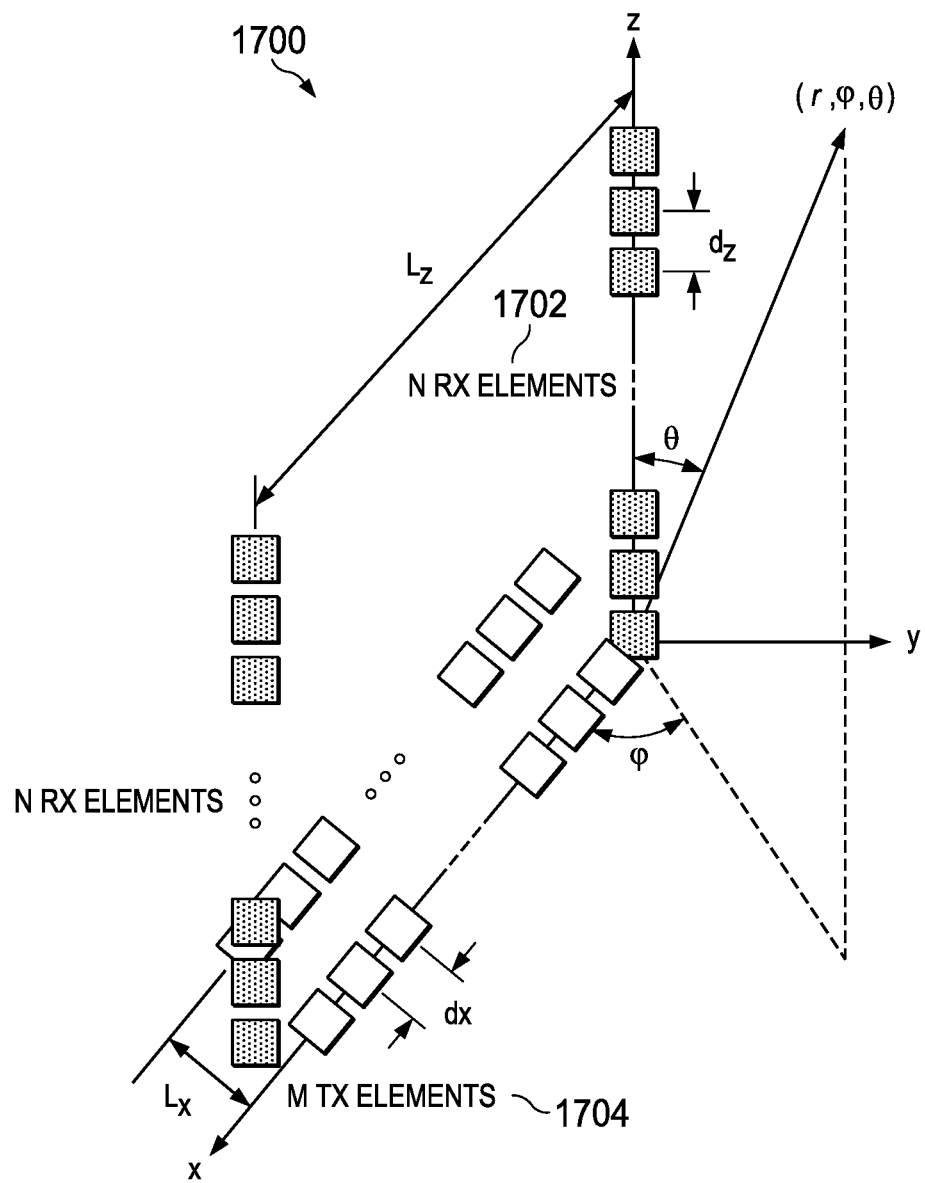
FIG. 17 illustrates an example beamforming with virtual antenna array in accordance with the present disclosure.

$W_A$: Analog beamforming within antenna sub-array
$W_D$: Digital beamforming matrix among sub-array DIA, IF/RE FIG. 17 illustrates an example beamforming with virtual antenna array 1700 in accordance with the present disclosure. An embodiment of the beamforming with virtual antenna array 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 17, a beamforming with virtual antenna array is performed using N Rx elements 1702 and M Tx elements 1704.

Figure 18:
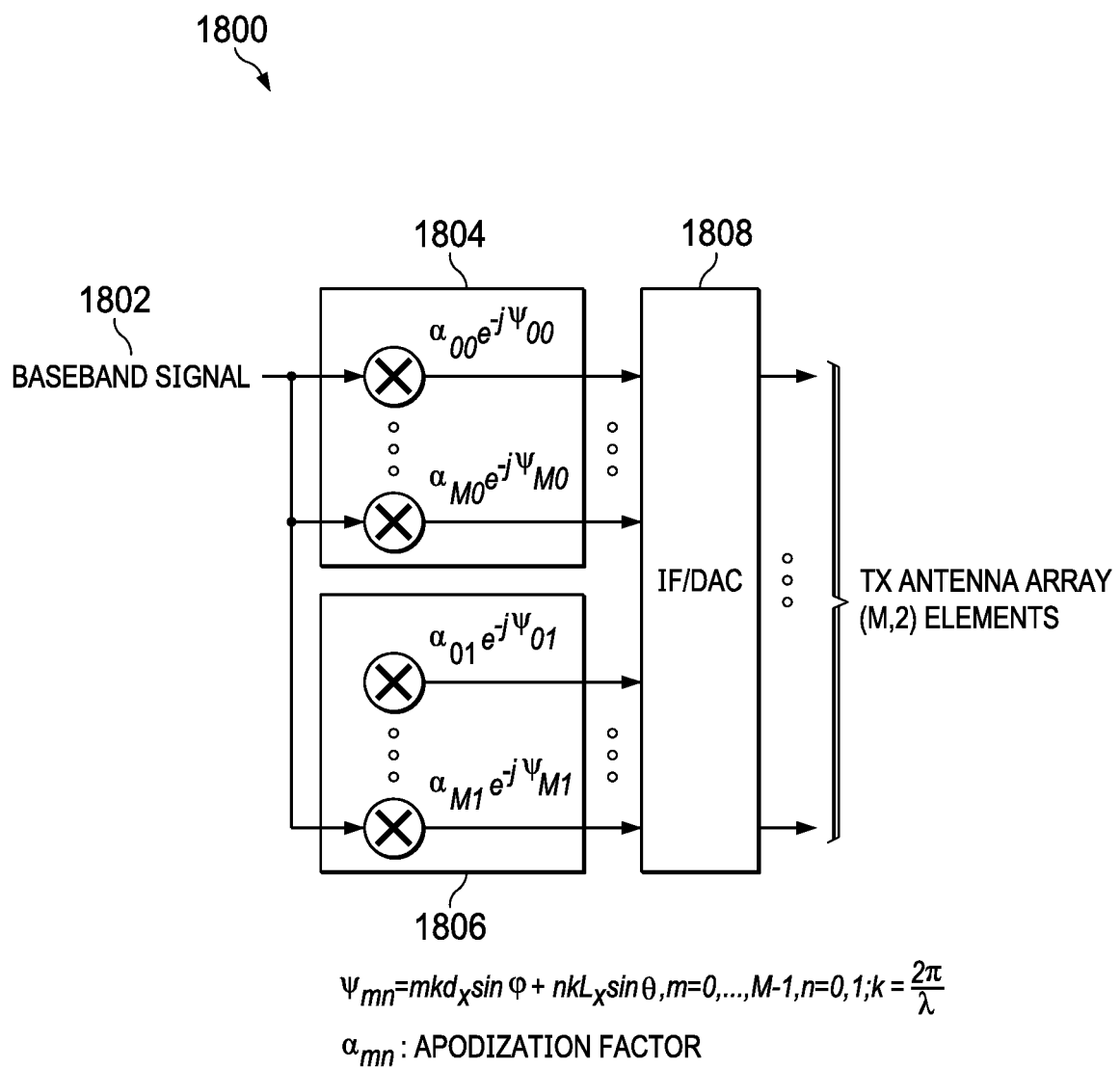
FIG. 18 illustrates an example transmit beamforming in accordance with the present disclosure.

FIG. 18 illustrates an example transmit beamforming 1800 in accordance with the present disclosure. An embodiment of the transmit beamforming 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 18, a Tx beamforming circuit includes a plurality of baseband signal input 1802, a set of adder block 1804, 1806, and an IF/DAC block 1808 connected to a plurality of Tx antenna array (M, 2) elements. In FIG. 18, it is assumed that simple antenna array with digital beamformer is considered.

Figure 19:
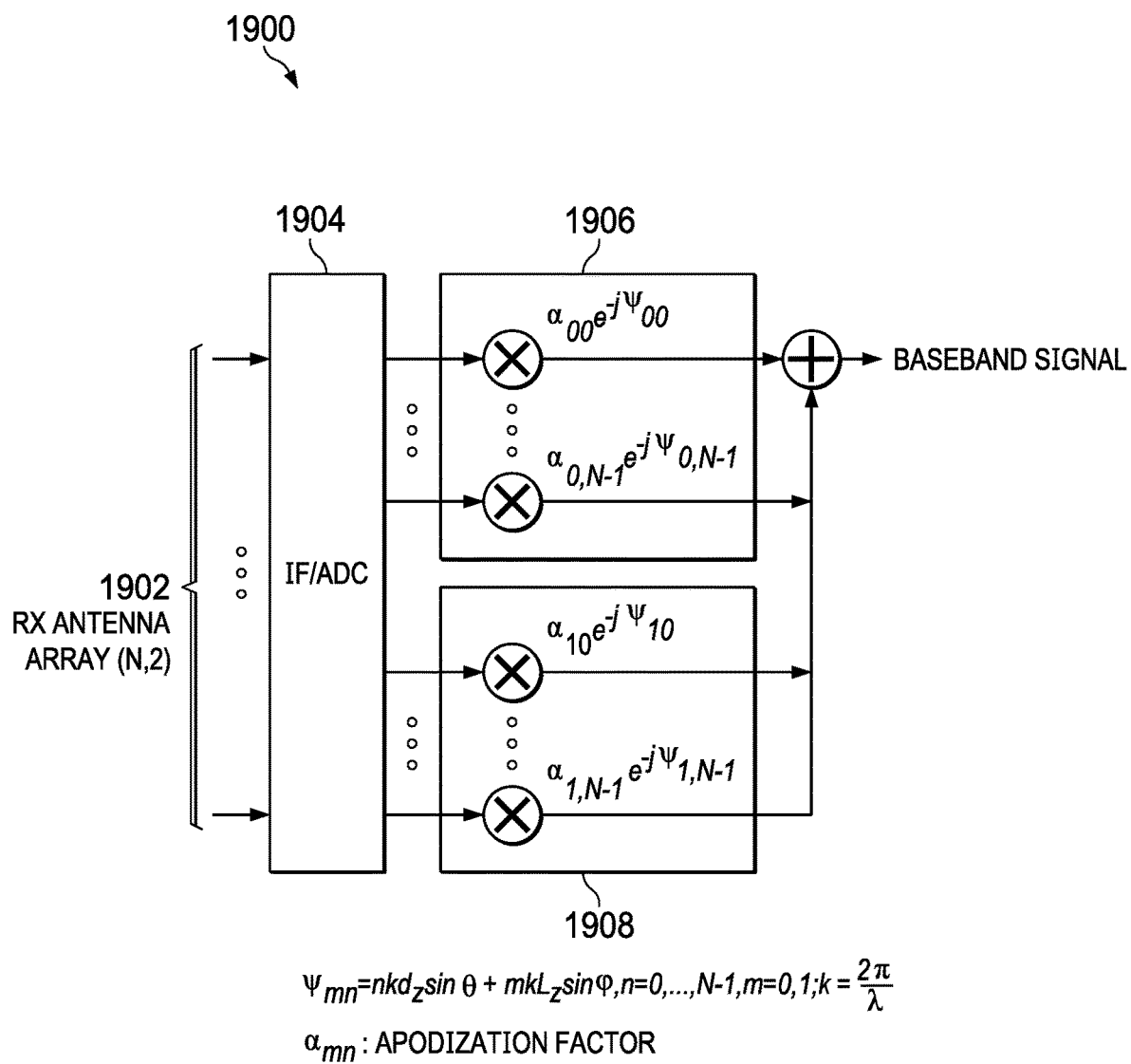
FIG. 19 illustrates an example receive beamforming in accordance with the present disclosure.

FIG. 19 illustrates an example receive beamforming 1900 in accordance with the present disclosure. An embodiment of the receive beamforming 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 19, an Rx beamforming circuit includes a plurality of Rx antenna array (N, 2) 1902 and an IF/ADC block 1904 comprising a plurality of output signals to be added to generate a baseband signal using a set of adders 1906, 1908. In FIG. 16, it is assumed that simple antenna array with digital beamformer is considered.

Figure 20:
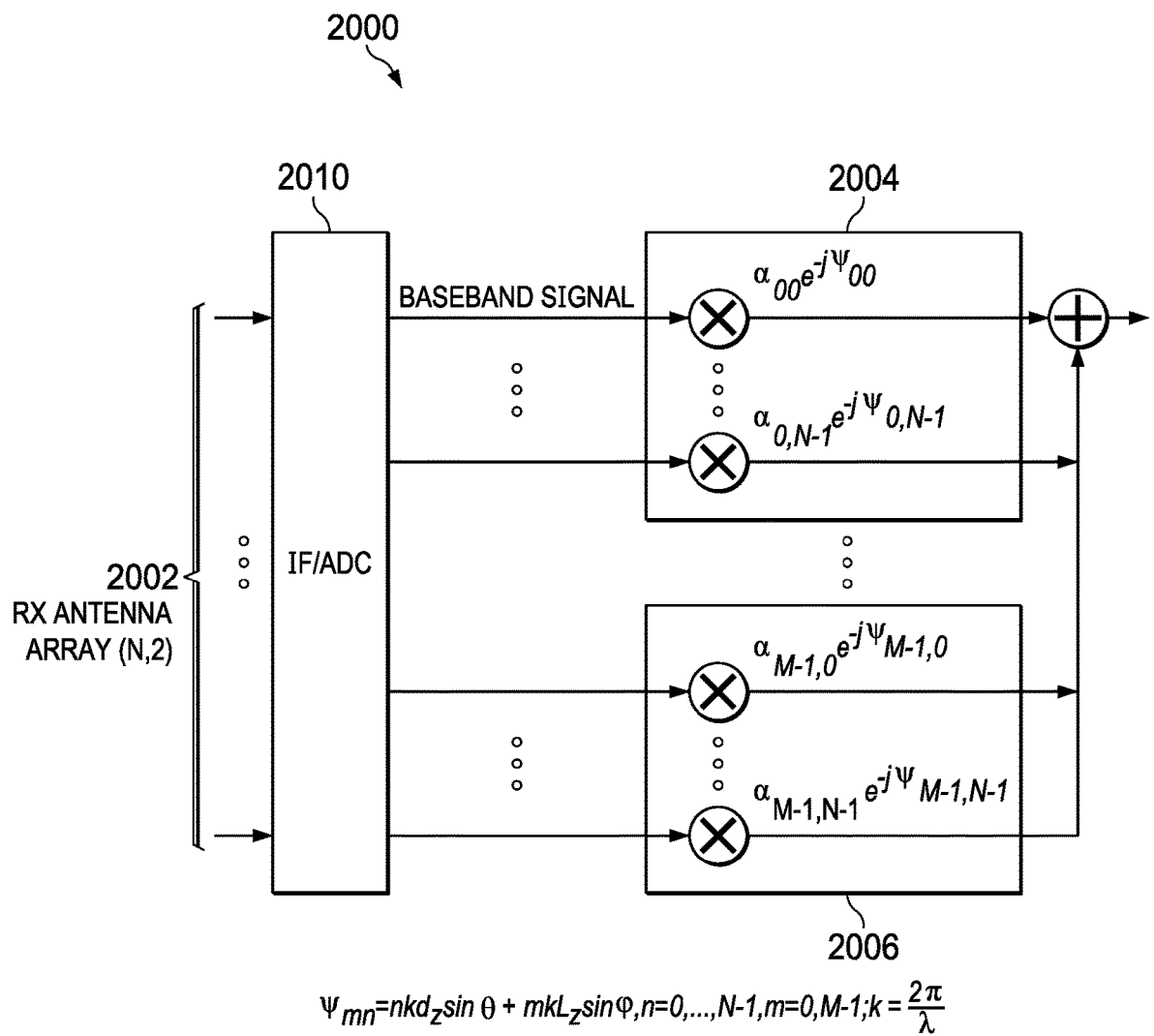
FIG. 20 illustrates an example receive beamforming with M antenna arrays in accordance with the present disclosure.

FIG. 20 illustrates an example receive beamforming with M antenna arrays 2000 in accordance with the present disclosure. An embodiment of the receive beamforming with M antenna arrays 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 20, an Rx beamforming with M antenna arrays circuit includes a plurality of Rx antenna array (N, 2) 2002, an IF/ADC block 2010 comprising a plurality of output signals to be added to generate a baseband signal using a set of adders 2004, 2006. In FIG. 20, it is assumed that simple antenna array with digital beamformer is considered.

Figure 21:
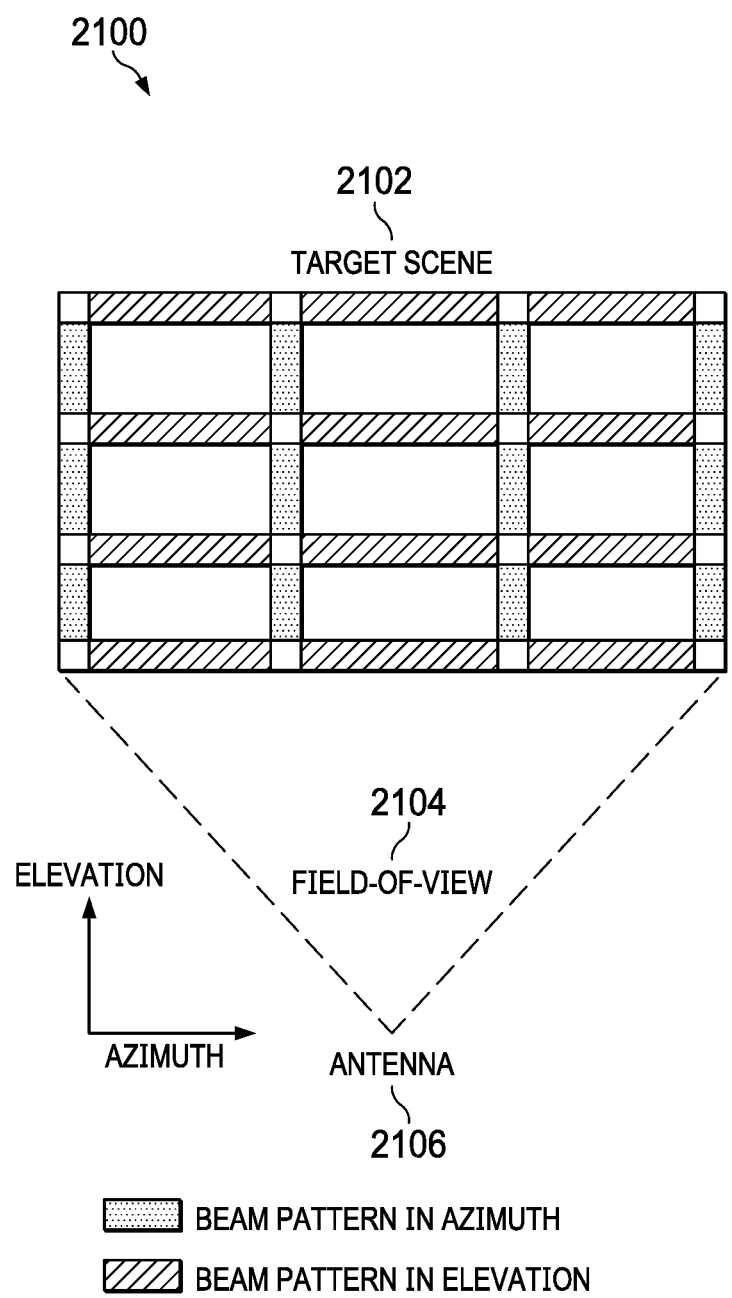
FIG. 21 illustrates an example multi-beam illumination and scheduling in accordance with the present disclosure.

FIG. 21 illustrates an example multi-beam illumination and scheduling 2100 in accordance with the present disclosure. An embodiment of the multi-beam illumination and scheduling 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 21, a multi-beam illumination and scheduling is determined in elevation and Azimuth. As illustrated in FIG. 21, a multiple-beam illumination in Azimuth at Tx includes digital BF or Butler matrix. As illustrated in FIG. 21, 2, 4, or 8 simultaneous beams are illuminated in practice for a target scene 2102 from an antenna 2106. Receiver processes are simultaneously performed for multiple Azimuth and elevation angles. In such case, a receiver can process the entire field-of-view (FoV) 2104 in elevation. As illustrated in FIG. 21, a beam scheduling determines Azimuth and/or elevation angles based on a configuration parameter. In such case, the beam scheduling can be dynamically adjusted based on previous results (e.g., tracking objects in certain areas).

Figure 22:
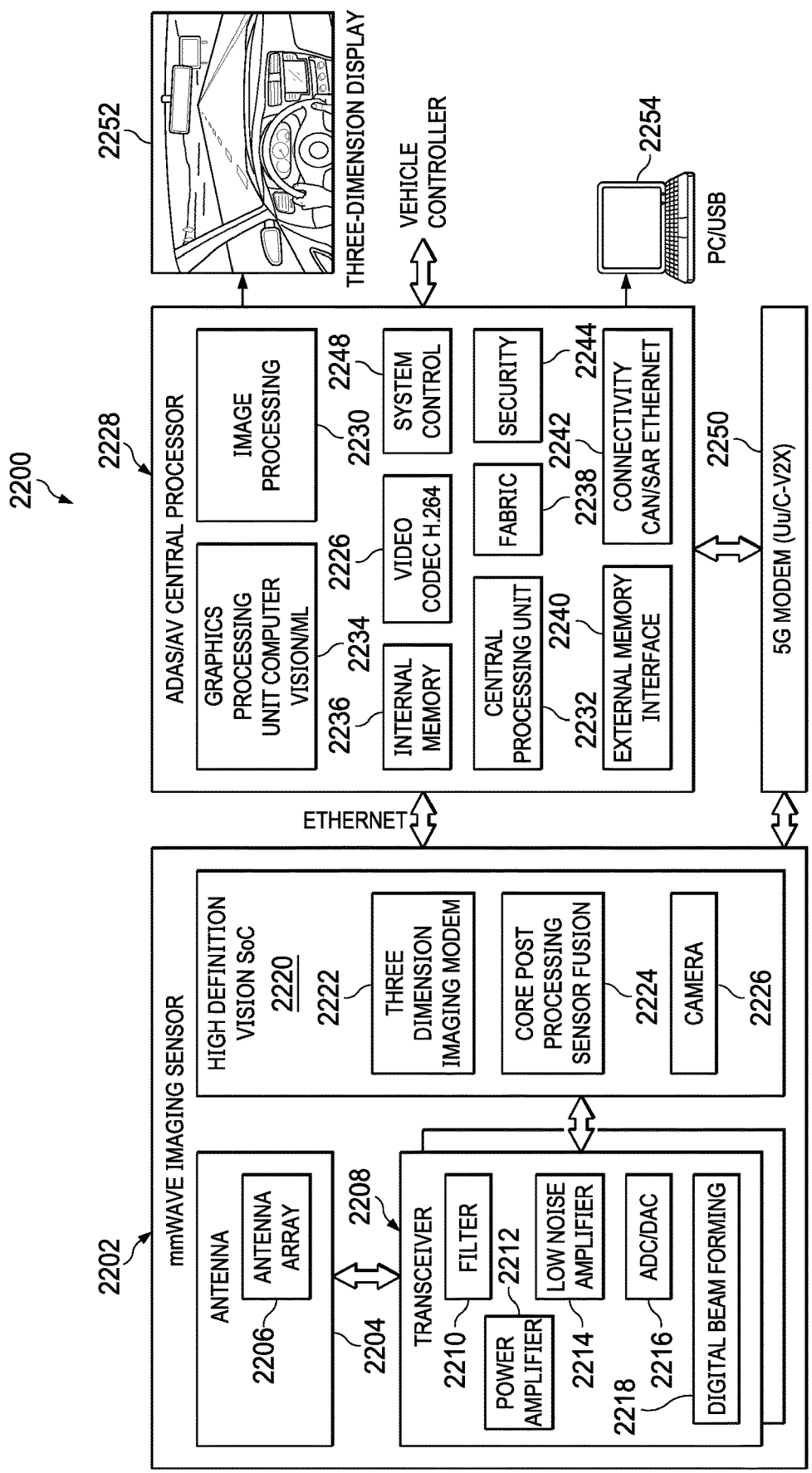
FIG. 22 illustrates an example apparatus in accordance with the present disclosure.

FIG. 22 illustrates an example apparatus 2200 in accordance with the present disclosure. An embodiment of the apparatus 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 22, the apparatus 2200 may be implemented as an advanced system or the apparatus 2200 may be implemented as one of components of the advanced system.

As illustrated in FIG. 22, an apparatus comprises a 5G modem 2250, a mmWave imaging sensor 2202, and an advanced driver assistance system/autonomous vehicle (ADAS/AV) central processor 2228. The ADAS/AV central processor 2228 may be connected with the mmWave imaging sensor 2202 through the network such as Ethernet. The ADAS/AV central processor 2228 is further connected to the modem (e.g., 5G) 2250 that is connected to the mmWave imaging sensor 2202. The ADAS/AV central processor 2228 may be connected with a display 2252 and/or a computer (e.g., terminal, device, etc.) 2254 including at least one peripheral device. The ADAS/AV central processor 2228 may be further connected with another processor (e.g., controller) that may be implemented in an external device and/or object (e.g., a vehicle).

The mmWave imaging sensor 2202 of the apparatus comprises: an antenna block 2204 including antenna array 2206; a transceiver block 2208 including a filter 2210, a power amplifier (PA) 2212, a low noise amplifier (LNA) 2214, an analog to digital converter/digital to analog converter (ADC/DAV) 2216, and a digital beamforming (BF) 2218; and a system on chip (SoC) block 2220 including a 3D imaging modem 2222, core post processing sensor fusion 2224, and a camera 2226.

The ADAS/AV central processor 2228 of the apparatus comprises an image processing block 2230, a central processing unit (CPU) 2232, a graphics processing unit (GPU) computer vision/machine learning (ML) 2234, an internal memory 2236, a fabric 2238, a video codec H.264 2226, a connectivity CAN/SAR Ethernet 2242, a security block 2244, an external memory interface 2240, and a system control block 2248.

Figure 23:
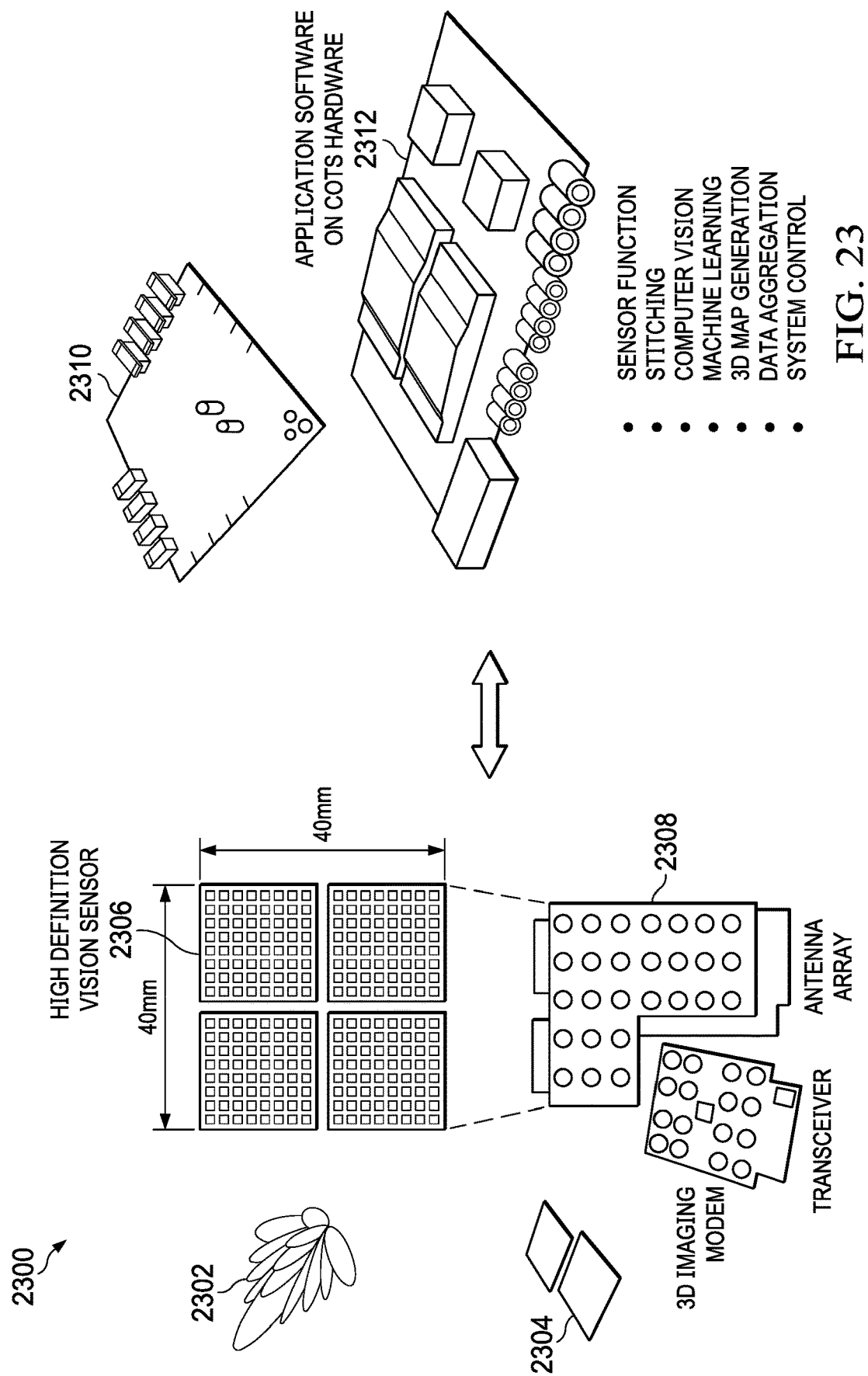
FIG. 23 illustrates an example sensor and application software in accordance with the present disclosure.

FIG. 23 illustrates an example sensor and application software 2300 in accordance with the present disclosure. An embodiment of the sensor and application software 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 23, an apparatus including beam pattern 2302, a sensor, a 3D imaging modem 2304, a transceiver and an antenna array 2308 (e.g., detail structure shown in 2306), and application software 2310 implemented on COTS hardware 2312 are configured for a sensor fusion, a stitching, a computer vision, machine learning, a 3D map generation, a data aggregation, and a system control.

Figure 24:
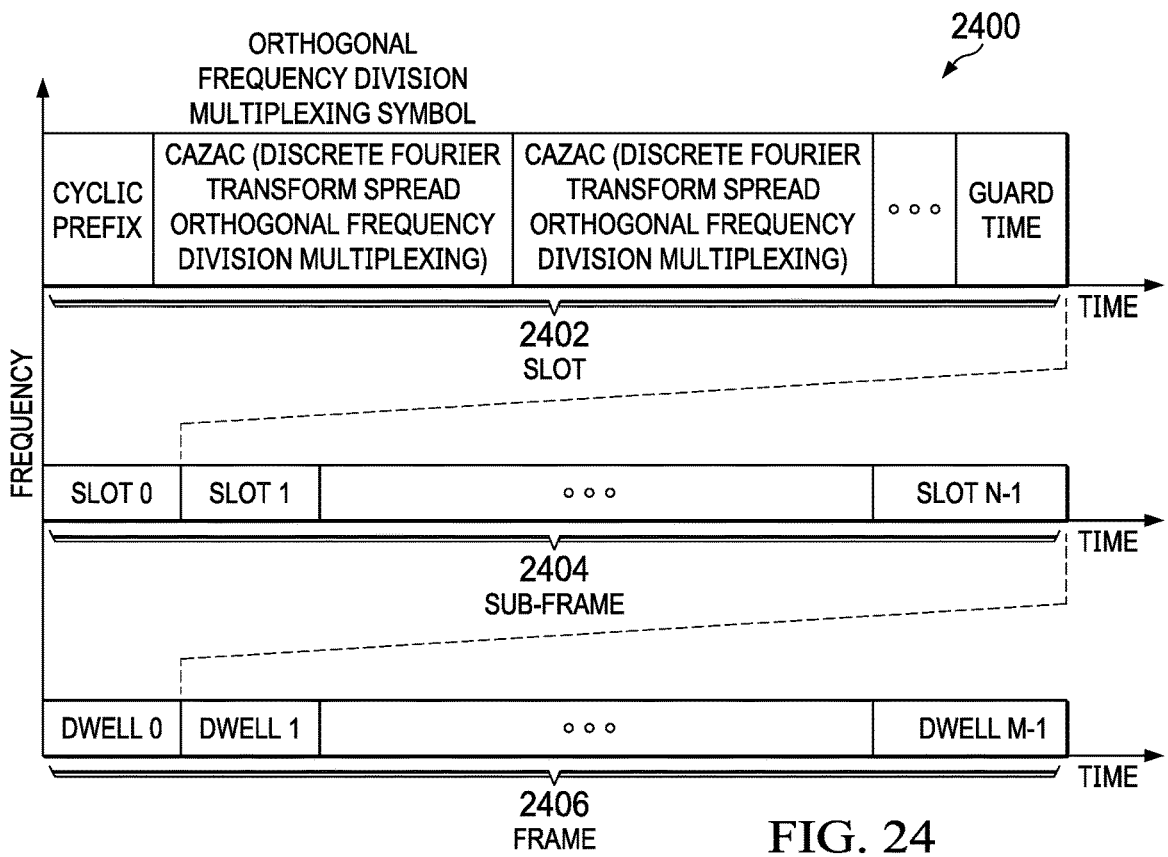
FIG. 24 illustrates an example frame structure of radar waveform in accordance with the present disclosure.

FIG. 24 illustrates an example frame structure of radar waveform 2400 in accordance with the present disclosure. An embodiment of the frame structure of radar waveform 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

FIG. 24 shows the frame structure of digital radar waveform. A "slot" 2402 is composed of cyclic prefix (CP), multiple OFDM symbols generated by DFT spreading of one or multiple CAZAC sequences, and guard time (GT). The GT is added depending on the required sequence length, and the range of interest for the target scene. In Format 1, only one sequence period is shown. A set of slots forms a sub-frame 2404. A set of sub-frames forms a frame 2406.

Range processing performs correlation processing of the received OFDM symbols relative to the transmitted coded signal, followed by coherent accumulation of the OFDM symbols within a slot. An OFDM symbol length is determined as the inverse of sub-carrier spacing, while a slot length is set within the channel coherence time. As an example, for 2 GHz RF bandwidth with 500 kHz sub-carrier spacing, FFT size is 4096 points, OFDM symbol length is 2 µsec, and channel coherence time is 8 µsec and 16 µsec for velocities 350 kmph and 175 kmph, respectively.

Multiple slots constitute sub-frames, which are used for Doppler processing. Each sub-frame signal illuminates the targets within its antenna footprint (or beam in scanning radar) resulting in reflection. A complete illumination of the target scene within the field-of-view results in a frame. A target scene is scanned multiple times, resulting in frame rate of 10 to 60 frames per second.

Figure 25:
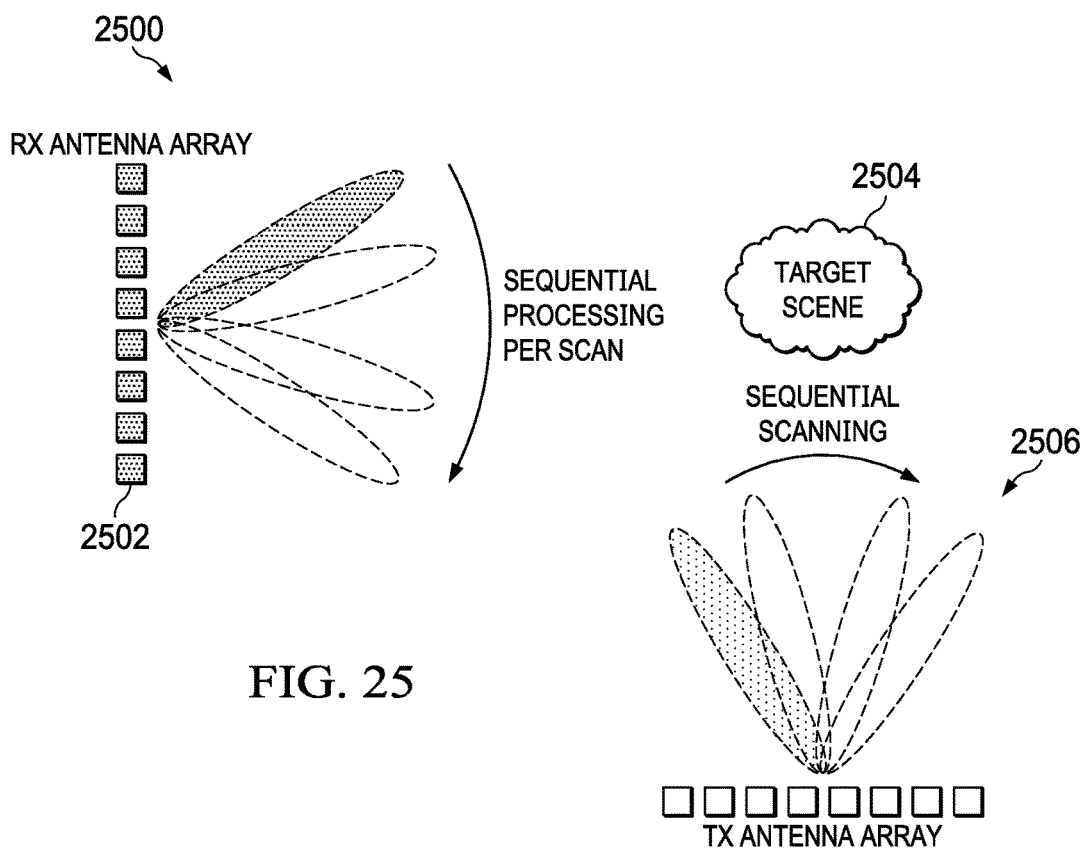
FIG. 25 illustrates an example image radar in accordance with the present disclosure.

FIG. 25 illustrates an example image radar 2500 in accordance with the present disclosure. An embodiment of the image radar 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 25, the image radar 2500 includes Rx antenna array 2502, a target scene 2504, and Tx antenna array 2506.

In conventional radar imaging, each beam may scan the target scene of interest sequentially. In 2D imaging, the target is illuminated with a narrow beam illuminating an area with a narrow transmit beam. For each illuminated area, the receiver scans the target area sequentially and estimates the angle-of-arrival. In analog beamforming, typically, single beam is generated due to required hardware complexity. In high-resolution imaging, the number of angle bins to be scanned is 100's to 1000's of points, requiring long acquisition time to generate point cloud image.

For each dwell, target scene is illuminated by the antenna and received signal from the Rx antenna is processed for imaging.

Figure 26:
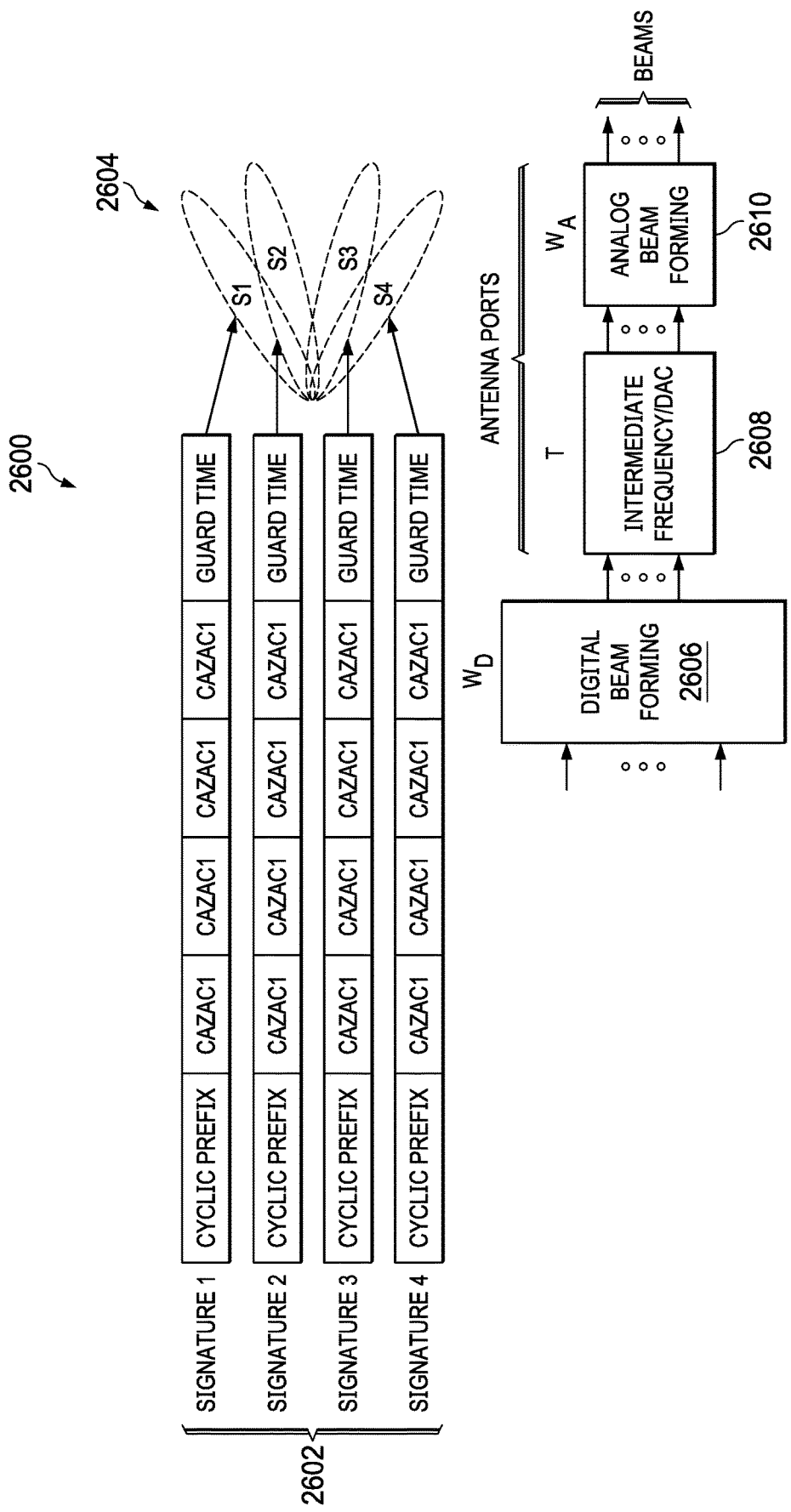
FIG. 26 illustrates an example wave form MIMO/beamforming radar transmission in accordance with the present disclosure.

FIG. 26 illustrates an example wave form MIMO/beamforming radar transmission 2600 in accordance with the present disclosure. An embodiment of the wave form MIMO/beamforming radar transmission 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

FIG. 26 shows the waveform for MIMO/beamforming radar transmission. MIMO/beamforming radar waveform is generated by a coded digital waveform generated by encoding of the signal in frequency-domain in case of OFDM radar waveform, or in time-domain in case of phase modulated radar. "Signature" 2602 denotes the slot signal from orthogonal CAZAC sequences. The signature is beam-formed by a digital beamformer or hybrid beamformer which is a combination of digital and analog beamformer. After beamforming, multiple streams of signal mapped to the beams 2604 are transmitted simultaneously, where each beam illuminates a portion of the target scene. As illustrated in FIG. 26, the signatures 2602 and the beams 2604 are processed through a digital BF 2606, an IF/DAC 2608, and an analog BF 2610.

Figure 27:
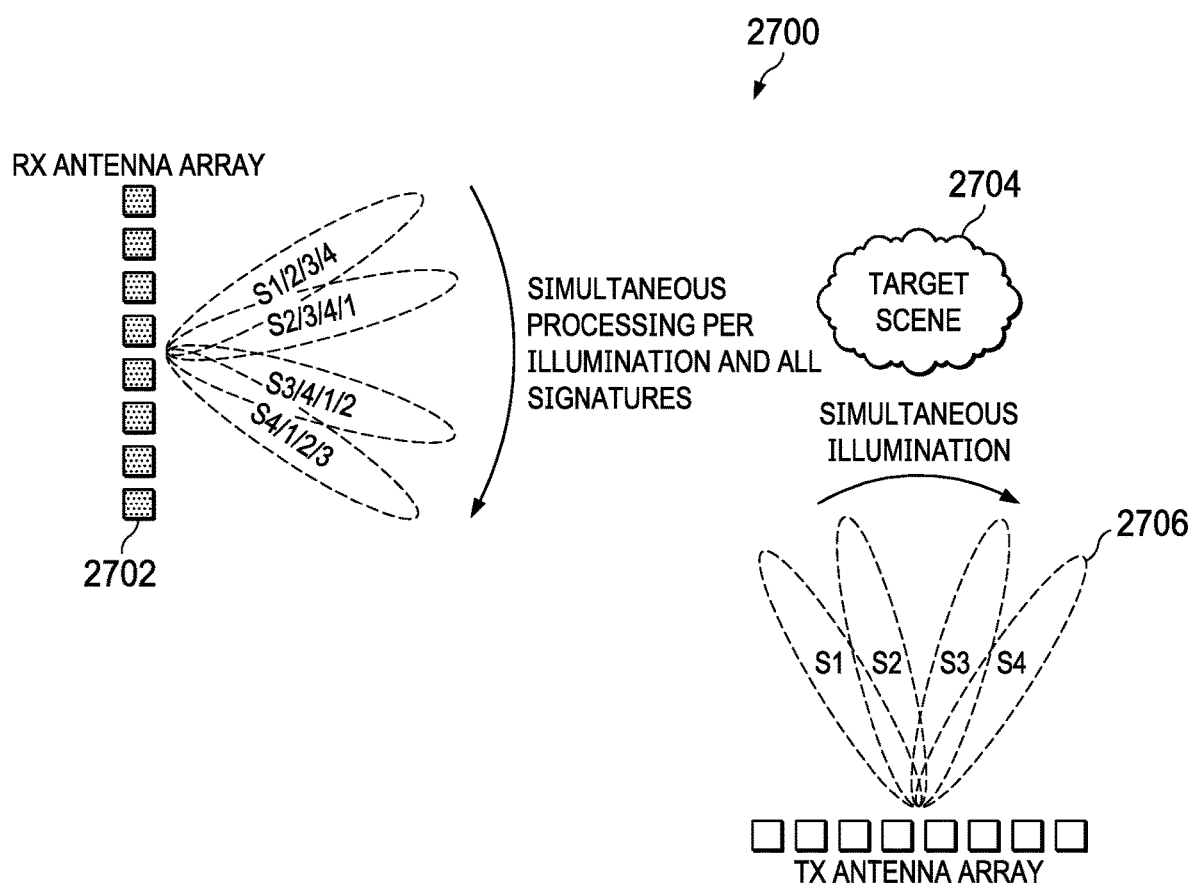
FIG. 27 illustrates an example MIMO/BF imaging radar in beamforming mode in accordance with the present disclosure.

FIG. 27 illustrates an example MIMO/BF imaging radar in beamforming mode 2700 in accordance with the present disclosure. An embodiment of the MIMO/BF imaging radar in beamforming mode 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

Multiple beams are generated simultaneously with digital beamforming. Thus, it is possible to obtain multiple points per scan. At the transmitter, multiple beams are generated illuminating portion(s) of the target scene with each beam using Tx antenna array 2706. In reality, signals from these beams interfere with each other, causing inter-beam interference. These appear as artifacts in the resulting imagery. At the receiver, signals are received at Rx Antenna array 2702 through a target scene 2704.

In the present disclosure, multiple CAZAC sequences generated by DFT-Spread OFDM are mapped to different beams. Sequences are mapped to each beam according to following two approaches.

In one embodiment, multiple root CAZAC sequences are mapped to each beam. This ensures that received signal after correlation processing has low auto-correlation value, minimizing inter-beam interference.

In another embodiment, orthogonal CAZAC sequences with zero autocorrelation property are generated by cyclic shift of the root CAZAC sequence. These sequences are mapped to each beam.

Multiple sequences are transmitted on multiple beams simultaneously. At the receiver, multiple correlators corresponding to multiple sequences are implemented for each beam. The receiver can process up to M×N correlators, where M is a number of transmit beams (=number of CAZAC sequence) and N is a number of receive beams.

In one example, where M=N=4, 4 beams are transmitted simultaneously. At the receiver, spatial processing for 4 beams, each computing correlation for 4 CAZAC sequences are implemented. This approach generates 16 points of point cloud for each dwell time, reducing the acquisition time by 16th.

Figure 28:
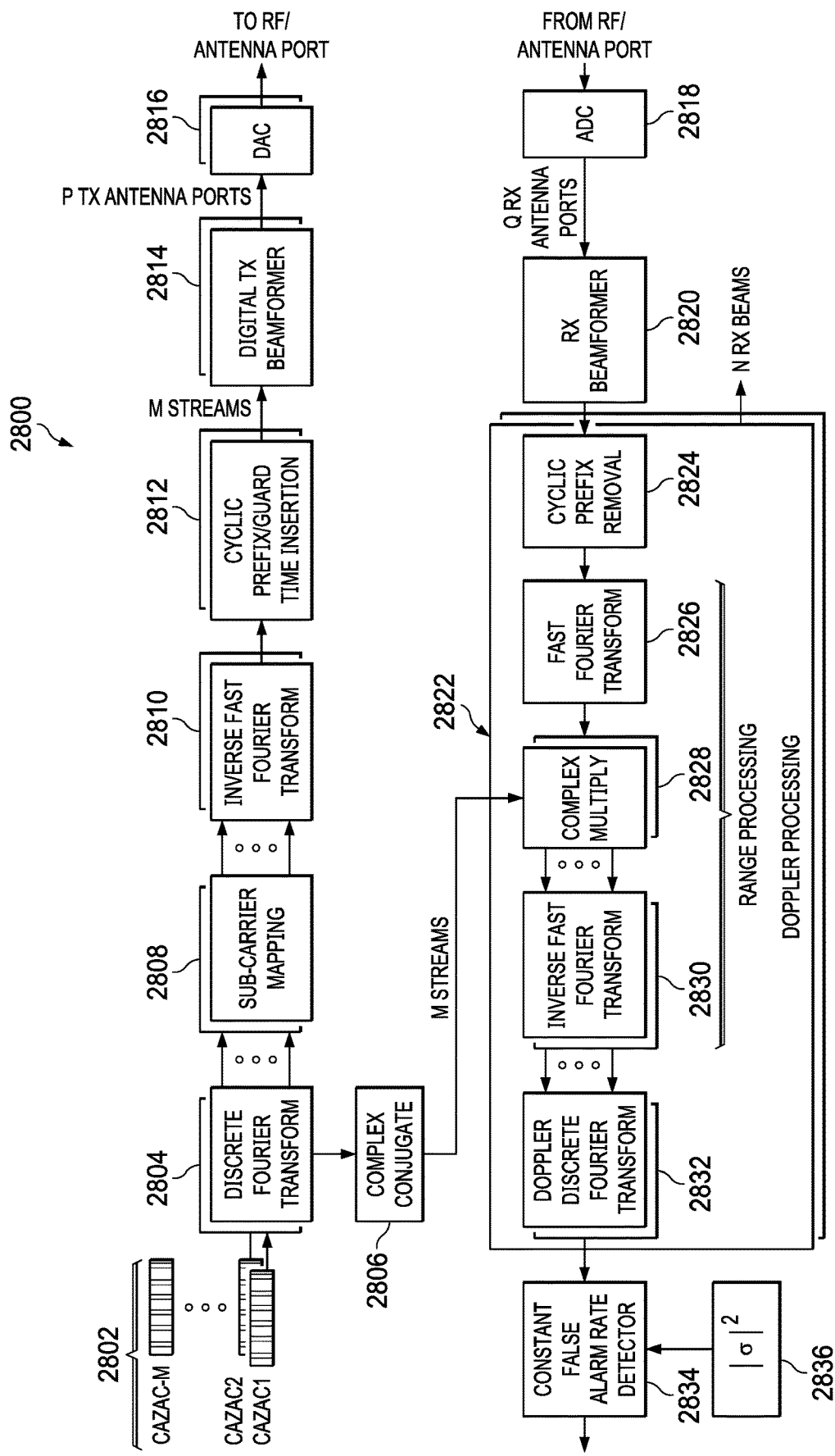
FIG. 28 illustrates an example multi-stream beamforming radar processing in accordance with the present disclosure.

FIG. 28 illustrates an example multi-stream beamforming radar processing 2800 in accordance with the present disclosure. An embodiment of the multi-stream beamforming radar processing 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 28, the multi-stream beamforming radar processing 2800 may be implemented as an advanced system or the multi-stream beamforming radar processing 2800 may be implemented as one of components of the advanced system.

Details of sequence generation, mapping, and beamforming processing are shown in FIG. 28. FIG. 28 illustrates digital beamforming with multi-beam transmission.

As illustrated in FIG. 28, the multi-stream beamforming radar comprises a set of CAZAC sequences 2802, a DFT block 2804, a complex conjugate block 2806, a sub-carrier mapping 2808, an IFFT block 2810, a CP/GT insertion block 2812, a digital Tx beamformer block 2814, a DAC block 2816, an ADC block 2818, an Rx beamformer block 2820, a set of blocks 2822 including a CP removal block 2824, an FFT block 2826, a complex multiply block 2828, an IFFT block 2830, and a Doppler DFT block 2832, respectively, a CFAR detector block 2834, and an arithmetic block 2836.

In hybrid beamforming, analog beamforming with phase shifters are implemented in the RF after ADC. The output signals of the digital beamformer are mapped to the antenna ports which is further beamformed with analog beamformer with phase shifter.

In some embodiment, for M transmit and N receive paths, the acquisition time for point cloud is reduced by M×N.

In MIMO mode, multiple antennas illuminate the target scene within the entire field-of-view.

Figure 29:
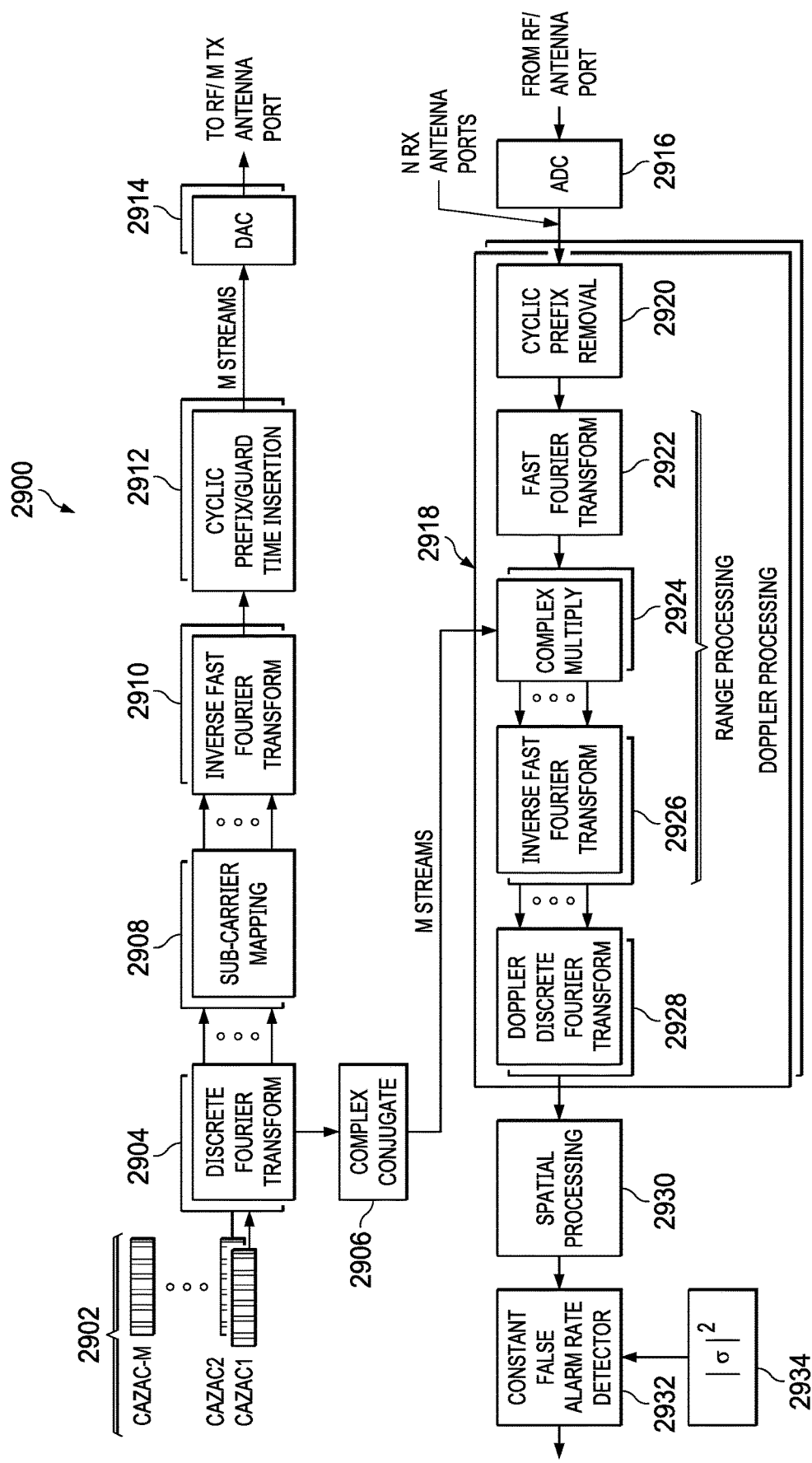
FIG. 29 illustrates another example multi-stream beamforming radar processing in accordance with the present disclosure.

FIG. 29 illustrates another example multi-stream beamforming radar processing 2900 in accordance with the present disclosure. An embodiment of the multi-stream beamforming radar processing 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions. Other embodiments are used without departing from the scope of the present disclosure.

CAZAC sequence is mapped to each antenna port in MIMO configuration. Block diagram of multi-stream MIMO radar is shown in FIG. 29.

As illustrated in FIG. 29, the multi-stream beamforming radar processing 2900 may be implemented as an advanced system or the multi-stream beamforming radar processing 2900 may be implemented as one of components of the advanced system.

As illustrated in FIG. 29, the multi-stream beamforming radar comprises a set of CAZAC sequences 2902, a DFT block 2904, a complex conjugate block 2906, a sub-carrier mapping 2908, an IFFT block 2910, a CP/GT insertion block 2912, a DAC block 2914, an ADC block 2916, a set of blocks 2918 including a CP removal block 2920, an FFT block 2922, a complex multiply block 2924, an IFFT block 2926, and a Doppler DFT block 2928, respectively, a special processing block 2930, a CFAR detector block 2932, and an arithmetic block 2934.

Multiple orthogonal CAZAC sequences generated by DFT-spread OFDM are mapped to antenna ports. In the receiver, Range/Doppler processing is achieved for each antenna port. After range/Doppler processing, spatial processing takes the data from multiple antenna ports and focuses the image depending on the range. Spatial focusing applies range-dependent correction factor to the range/Doppler compressed data. In one embodiment, a computationally efficient image focusing algorithm with FFT may be applied as shown in the aforementioned embodiments.

Figure 30:
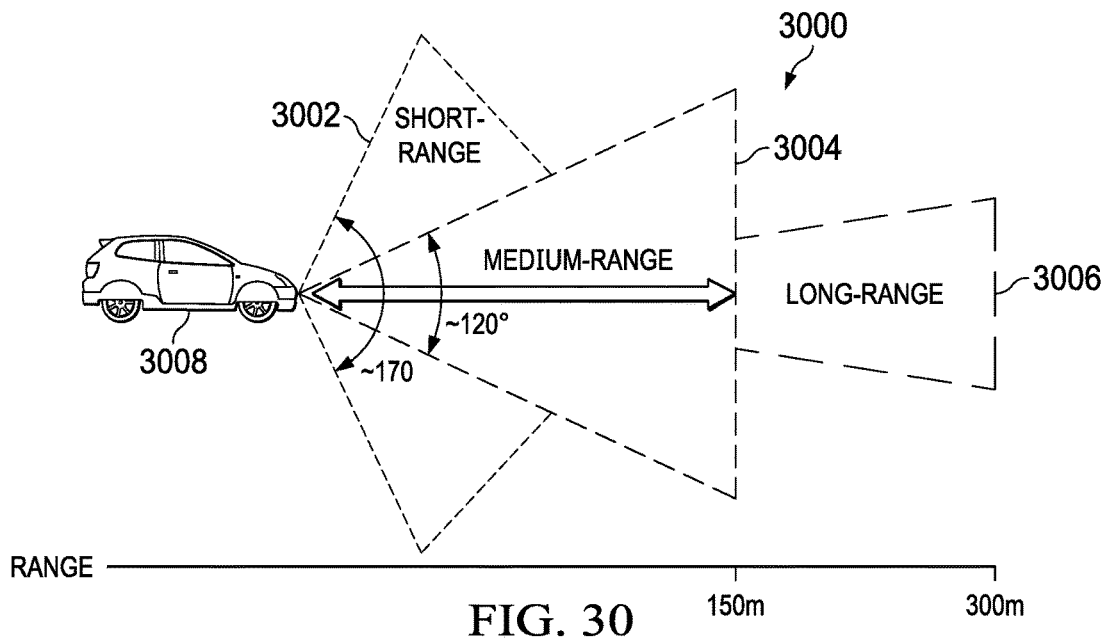
FIG. 30 illustrates an example simultaneous operation of short-range and long-rang radar in accordance with the present disclosure.

FIG. 30 illustrates an example simultaneous operation of short-range and long-rang radar 3000 in accordance with the present disclosure. An embodiment of the simultaneous operation of short-range and long-rang radar 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions. Other embodiments are used without departing from the scope of the present disclosure.

For objects located close to the transmit antenna, received SINR is high. Multiple MIMO streams are transmitted with large field-of-view, illuminating wide field of view up to 170°.

As illustrated in FIG. 30, a car 3008 transmit beam in a short-range 3002, in a medium-range 3004, and in a long-range 3006.

In one embodiment, for simultaneous short-range and long-range operation, MIMO and beamforming mode transmission and reception applies alternating dwell times. At even subframe number, MIMO transmission and reception takes place. At odd subframe number, beamforming transmission and reception takes place.

In one embodiment, for simultaneous short-range, medium-range, and long-range operation, MIMO, MIMO and beamforming, and beamforming transmission/reception applies sequentially within a subframe.

In one embodiment, at the receiver, a spatial processing is performed for the target distance after range/Doppler processing.

Figure 31:
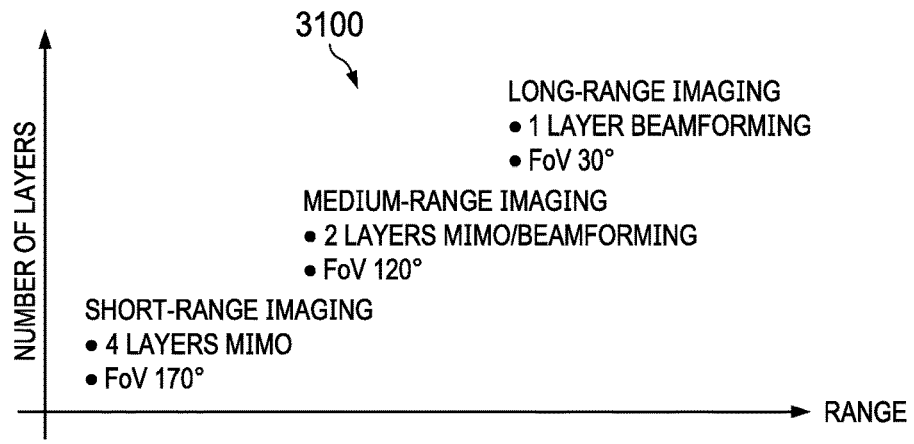
FIG. 31 illustrates an example range dependent imaging operation in accordance with the present disclosure.

FIG. 31 illustrates an example range dependent imaging operation 3100 in accordance with the present disclosure. An embodiment of the range dependent imaging operation 3100 shown in FIG. 31 is for illustration only. One or more of the components illustrated in FIG. 31 can be implemented in specialized circuitry configured to perform the noted functions or one or more of the components can be implemented by one or more processors executing instructions to perform the noted functions. Other embodiments are used without departing from the scope of the present disclosure.

FIG. 31 shows the principle of range dependent imaging operation. Different spatial processing depending on range applies after range-Doppler processing.

Figure 32:
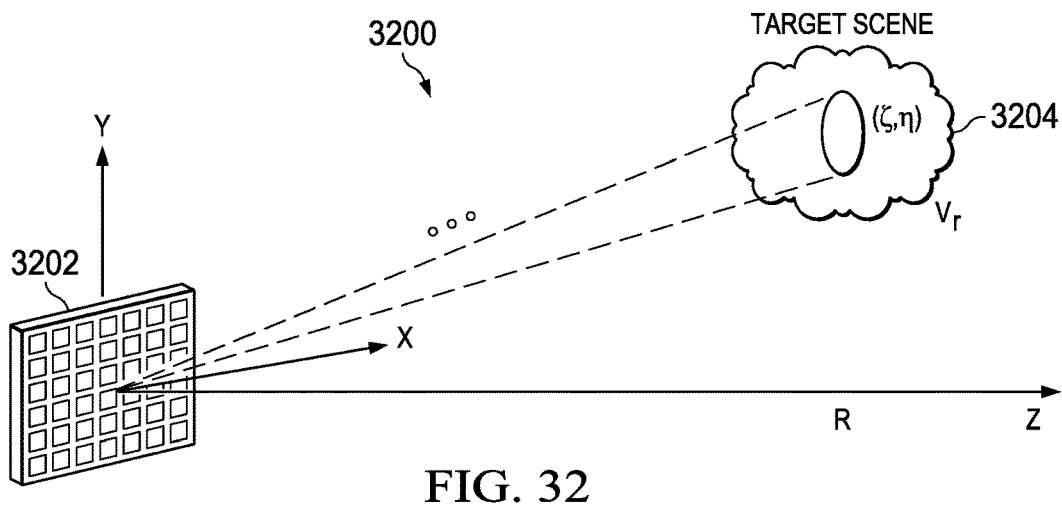
FIG. 32 illustrates an example geometry of image formation in accordance with the present disclosure.

FIG. 32 illustrates an example geometry of image formation 3200 in accordance with the present disclosure. An embodiment of the geometry of image formation 3200 shown in FIG. 32 is for illustration only. One or more of the components illustrated in FIG. 32 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 32, an antenna array 3202 transmit signal to a target scene 3204.

In one embodiment, a digital imaging module performs computational imaging operations such as an image formation algorithm to determine the target reflectivity, which is the fraction of a signal (e.g., electromagnetic or optical signal) incident to the target that is reflected from the target. The digital imaging module thus uses the image formation algorithm to calculate voxels (volume pixel) having coordinates (x, y, r) to generate a 3-D image of a far field scene being illuminated by the 3-D imaging sensor of the present disclosure. The (x, y, r) coordinates are calculated using a 2-D Fast Fourier Transform of the reflectivity density $\rho$, which is the reflection of the signal that is impinging on a target segment per infinitesimal volume $d\zeta d\eta dr$. The electivity density of the target can thus be modeled as a function of the three variables, $(\zeta, \eta,)$ as will be discussed below.

The image formation algorithm also makes adjustments made to the resultant phase shifts of the reflected transmit signals reflected or backscattered by the far field scene. The adjustments reduce or significantly eliminate the resultant phase shifts experienced by the transmit signals after they were emitted by an energy emitting element of the Array, to a far field scene, reflected or backscattered by the scene and received by one or more energy detector element of the Array.

In one embodiment, a value for the coordinate r associated for each adjusted (x, y) set of coordinates is also calculated by the image formation algorithm by performing a 2-D FFT of the reflectivity density of a target from which a transmitted signal by the 3-D imaging sensor is reflected. Thus, for each value of r calculated, i.e., $r=R_1, R_2, R_3, \ldots R_N$, for a particular (x, y) coordinate, there is a corresponding voxel $(x, y, R_1), (x, y, R_2)$ that can be computed by the 3-D imaging sensor of the present disclosure thus generating a 3-D image of a far field scene. The coordinate r represents a distance between the corresponding energy detector element (element detecting the reflected transmit signal) having coordinates (x, y) and a target point of a far field scene being illuminated by the transmit signals emitted by the array. The transmitted signal is reflected (or backscattered) by the target point and is then detected by one or more energy detector elements of the array having a coordinate of (x, y).

For that particular set of coordinates, the 3-D imaging sensor of the present disclosure calculates the r value for different values of r ($r=R_1, r=R_2, r=R_3, \ldots$) in the process of generating a 3-D image of the far field scene being illuminated. The resulting voxels thus have coordinates (x, y, $R_1$), (x, y, $R_2$), (x, y, $R_N$) where N is an integer equal to 1 or greater.

In one embodiment, a transmit signal comprises a digitally beam formed orthogonal digital waveform modulated by a MIMO processed frequency domain PN sequence (e.g., orthogonal MIMO signals), said digitally beam formed orthogonal digital waveform is converted to an analog waveform signal caused to modulate an energy source resulting in a modulated signal that is then analog beam formed to obtain the transmit signal applied to the one or more energy emitter elements of the array. The operation of analog beam forming comprises applying a signal directly to an element of the array to provide a certain phase value to the element. The phase of that element does not change until the signal (e.g., voltage, current) is no longer applied.

The receiver is configured to detect energy received by the energy detector elements of the array and demodulate the received signals to derive the baseband signal from the received signals. The receiver is further configured to perform operations comprising computational imaging on a received digital signal to generate one or more 3-D images of objects, structures or an overall scene from which the transmit signals are reflected. The objects, structures, or other items of the scene are located in the far field with respect to the array.

The computational imaging comprises at least an image formation algorithm for making adjustments to the resultant phase shift experienced by the reflected or backscattered transmitted signal received by one or more energy detector elements of the array and for generating a 3-D image of the received reflected or backscattered signal through the use of a 2-D FFT operation performed on the signal. In particular, the received transmitted signal is detected and the baseband signal is retrieved through demodulation. The signal is then converted to a digital signal with the use of an analog to digital converter. The 2-D FFT operation is then performed on the digital signal to generate the 3-D image of a scene in a far field being illuminated by the 3-D imaging sensor.

The 3-D image is based on illumination of target locations of objects, structures or other items in the scene being illuminated. Clearly, each target location does not necessarily have the same distance. The distance between an energy detector element of the array and a target location may change and most often does for different target locations. For example, the distance may be R for a first target location, then changes to $R_1$ for another location and then $R_2$ for yet another location. The coordinates (x, y) and calculated (r) coordinate result in (x, y, r) coordinates representing voxels (volume pixels) of a 3-D image of a target of an object being illuminated by the transmit signal from the 3-D imaging sensor of the present disclosure. A 3-D image of the object is thus obtained.

Figure 33:
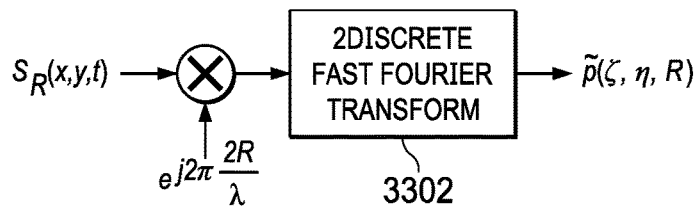
FIG. 33 illustrates an example image formation algorithm in accordance with the present disclosure.

FIG. 33 illustrates an example image formation algorithm 3300 in accordance with the present disclosure. An embodiment of the image formation algorithm 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 33, DFFT 3302 is used to generate an output signal.

In one embodiment of short-range imaging, for a transmission, MIMO transmission with 4 layers is provided, and for reception, MIMO reception with 4 layers followed by distance dependent spatial processing according to near-field image formation algorithm is provided as shown in the aforementioned embodiments.

In one embodiment of medium-range imaging, for transmission, MIMO with beamforming transmission with 2 layers per beam is provide, and for reception, MIMO reception with 2 layers per beam followed by receive beamforming is provided.

In one embodiment of long-range imaging, for transmission, beamforming with single layer transmission is provide, and for reception, single layer receive beamforming per beam is provided.

In the present disclosure, multi-stream transmission and reception schemes for high-resolution radar are provided. The present disclosure allows transmission and reception of the signal in multiple beams in beamforming mode, or multiple antennas in MIMO mode, without interference between the beams or antennas. The present disclosure reduces the acquisition time by M×N fold, where M is a number of transmit beams (or MIMO layers) and N is a number of received beams (or MIMO layers). This present disclosure provides embodiments that may be applied for high-resolution imaging radar in automotive applications, where large number of channels and frame rate is required.

MIMO radar is promising for near-field imaging applications, where SINR is large. The present disclosure allows general image focusing algorithm after range/Doppler processing, allowing high-resolution images without artifacts.

For M=N=4, 16-fold reduction in acquisition time is possible compared with conventional approach with scanning analog Tx/Rx beams, or 4-fold reduction in case of multiple beams without 4-stream transmission.

Next generation radar system technologies comprise new waveforms such as an orthogonal frequency division multiplexing (OFDM) and a code division multiple access (CDMA); multi-input multi-output (MIMO) antennas with digital beamforming; 3D/4D imaging; and simultaneous communication and radar.

It is well known that despite its simplicity, a CDMA system suffers interference and multi-path dispersion, and is susceptible to a phase noise. Benefits of OFDM over frequency-modulated continuous-wave (FM-CW) radars are well understood.

In such radar systems, the waveform is simple to generate, reducing a transceiver complexity compared with a FM-CW and Chirp sequence modulation. In such radar systems, a waveform does not require linear frequency generation in hardware. In such radar systems, unlike phase modulated signals, which is susceptible to self-interference and multi-path interferences, an OFDM waveform does not have stringent phase noise requirements, nor does it suffer from multi-path interferences. In such radar systems, an OFDM is ideally suited for MIMO processing.

Despite the benefits, OFDM signal generation and processing for high-resolution radars are challenging due to wide bandwidth processing required for the high-resolution radars. Automotive radars in 76 GHz-81 GHz has a signal bandwidth of 1 GHz to 5 GHz, requiring an analog-to-digital (ADC) rate that exceeds 10 Gsps with a large number of bits.

A cost of a 12-bit 10 Gsps ADC is about $3,650. For 3D radar imaging requiring 10's to 100's channels, wideband OFDM radar systems are cost prohibitive. As such, commercially available radar transceivers rely on FMCW signals.

Figure 34:
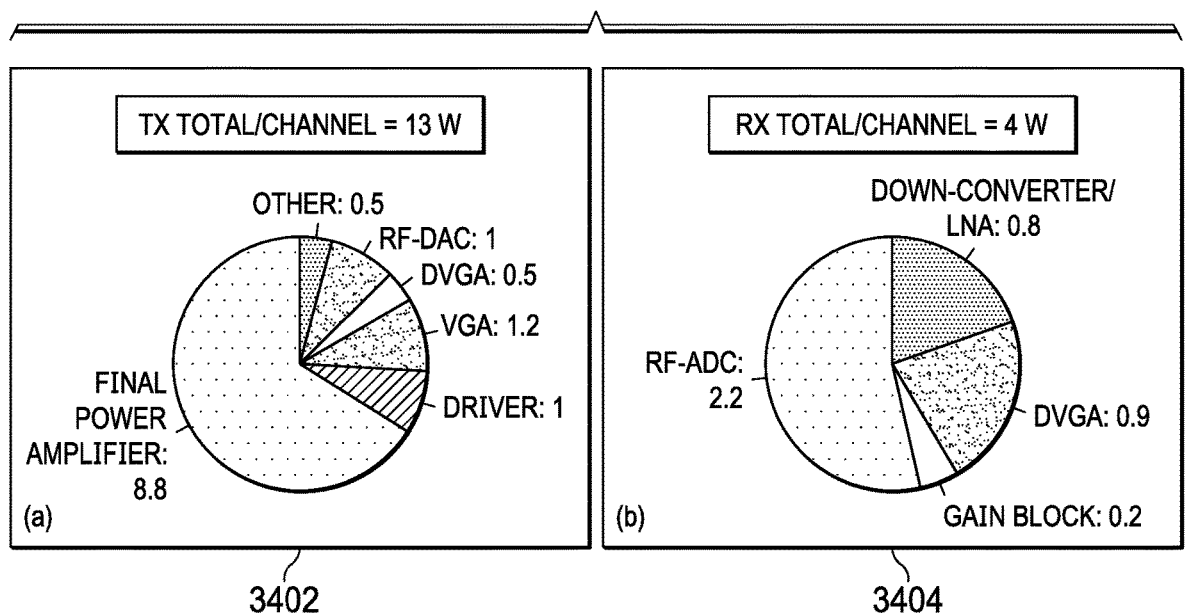
FIG. 34 illustrates an example power dissipation per transmit and receive paths in a mm Wave transceiver in accordance with the present disclosure.

FIG. 34 illustrates an example power dissipation per transmit and receive paths in a mmWave transceiver 3400 in accordance with the present disclosure. An embodiment of the power dissipation per transmit and receive paths in a mmWave transceiver 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions. Other embodiments are used without departing from the scope of the present disclosure.

Another consideration is power consumption. Power consumption analysis of state-of-art mmWave OFDM system is shown in FIG. 34.

As illustrated in FIG. 34, power amplifier (PA) and radio frequency-ADC (RF-ADC) account for 67% and 55% of power dissipation in transmit and receive paths, respectively. Low-power PA and simpler ADC design is critical in a transceiver design. As illustrated in FIG. 34, power dissipation per transmit path (e.g., FIG. 34 (a)) and power dissipation per receive path (e.g., FIG. 34 (b)) are provided.

In one embodiment, a scheme for a sub-channel coded OFDM with aggregation is provided. In such embodiment, the scheme for the sub-channel coded OFDM with aggregation retains performance benefits of a wideband OFDM system, while reducing complexity associated with a wide bandwidth signal, for efficient multi-stream MIMO/beamforming radar, as may be performed by an advanced system.

An OFDM system requires real-time implementation of fast Fourier transform/inverse fast Fourier transforms (FFT/IFFTs). For wide band radar with up to 5 GHz bandwidth, high range resolution requires the signal at sampling rate of 0.5 ns, 0.25 ns or faster is processed.

Automotive applications with range of up to 300 m require computation of range processing every 2 μsec. At a transmitter, time-domain signal can be pre-computed for DAC and modulation so that there may not issues in real-time computation.

However, for a receiver, 4K and 8K FFT/IFFT and complex multiplication followed by CFAR detection is required per path for 2 GHz and 4 GHz bandwidths, respectively. Although complexity of the receiver is lower than a time-domain PM radar, significant computational burden for real-time implementation of state-of-art field-programmable gate arrays (FPGAs) or application-specific integrated circuit (ASIC) is caused.

In conventional radars, "stretch processing" is employed for range processing to reduce signal processing requirements. The "stretch processing" uses a longer time frame to sweep radar bandwidths, slowing down transmit/receiver processing operation. However, this approach is not applicable to automotive radars, where a sequence length and a required range are comparable. The "stretch processing" would reduce the maximum range of radar systems.

In one embodiment, exploiting CAZAC waveform with circular correlation property, a computationally efficient receiver is provided to reduce computational complexity of range processing by more than 15 times for real-time implementation on FGPA and ASIC.

Figure 35A:
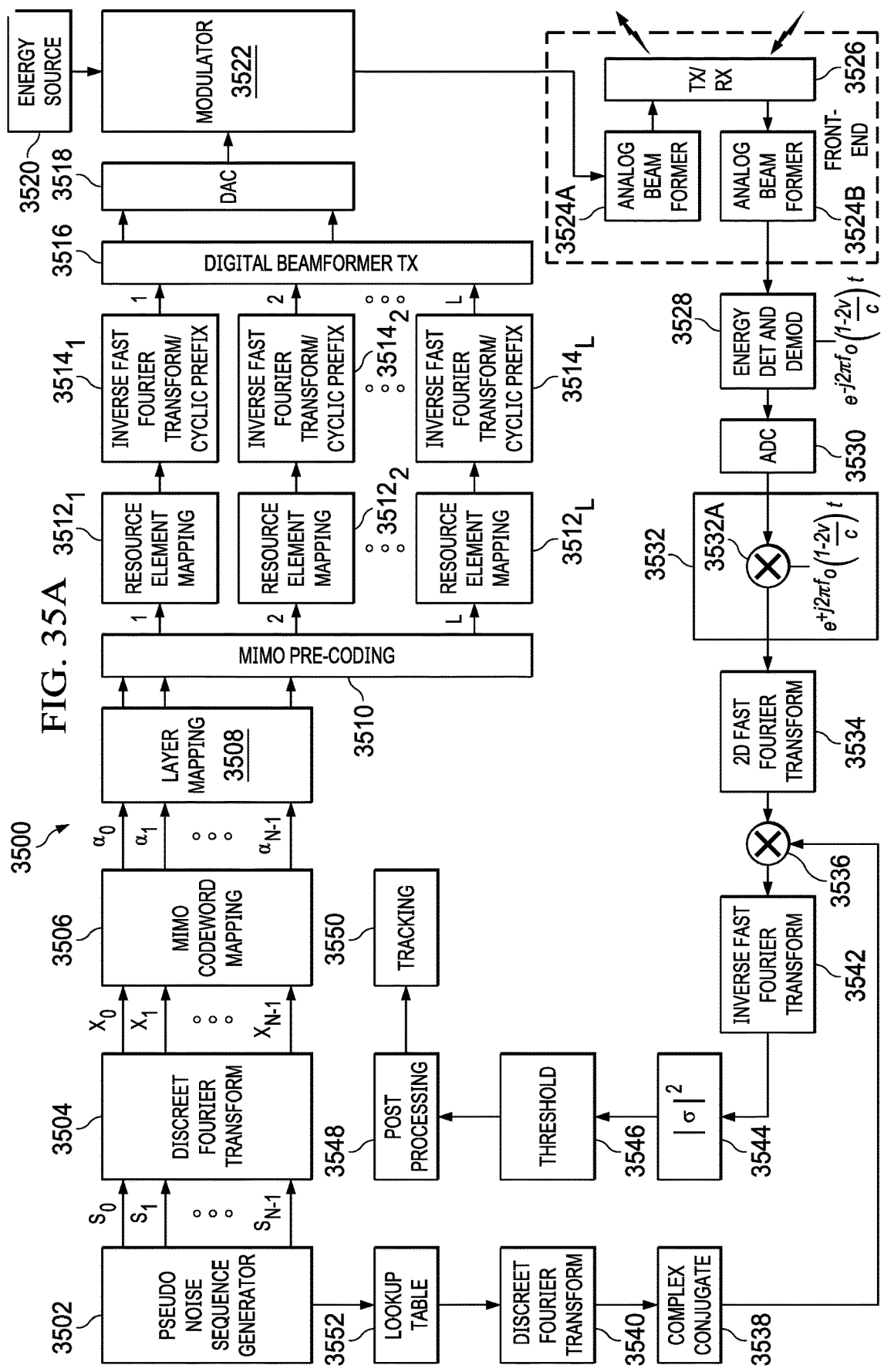
FIG. 35A illustrates an example 4D imaging radar in accordance with the present disclosure.

FIG. 35A illustrates an example 4D imaging radar 3500 in accordance with the present disclosure. An embodiment of the 4D imaging radar 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 35A, the imaging radar 3500 may be implemented as an advanced system or the imaging radar 3500 may be implemented as one of components of the advanced system.

As illustrated in FIG. 35A, the 4D imaging radar 3500 comprises a PN sequence generator block 3502, a DFT block 3504, a MIMO codeword mapping block 3506, a layer mapping block 3508, a MIMO precoding block 3510, a set of RE mapping blocks 3512, a set of IFFT/CP blocks 3514, a digital BF Tx block 3516, a DAC block 3518, an energy source 3520, a modulator block 3522, a set of analog blocks 3524, a Tx and Rx antenna block 3526, an energy detection and demodulation block 3528, an ADC block 3530, an adder block 3532, a 2D FFT block 3534, an adder block 3536, a complex conjugator block 3538, a DFT block 3540, an IFFT block 3542, an arithmetic block 3544, a threshold block 3546, a post processing block 3548, a tracking block 3550, and a lookup table block 3552.

Figure 35B:
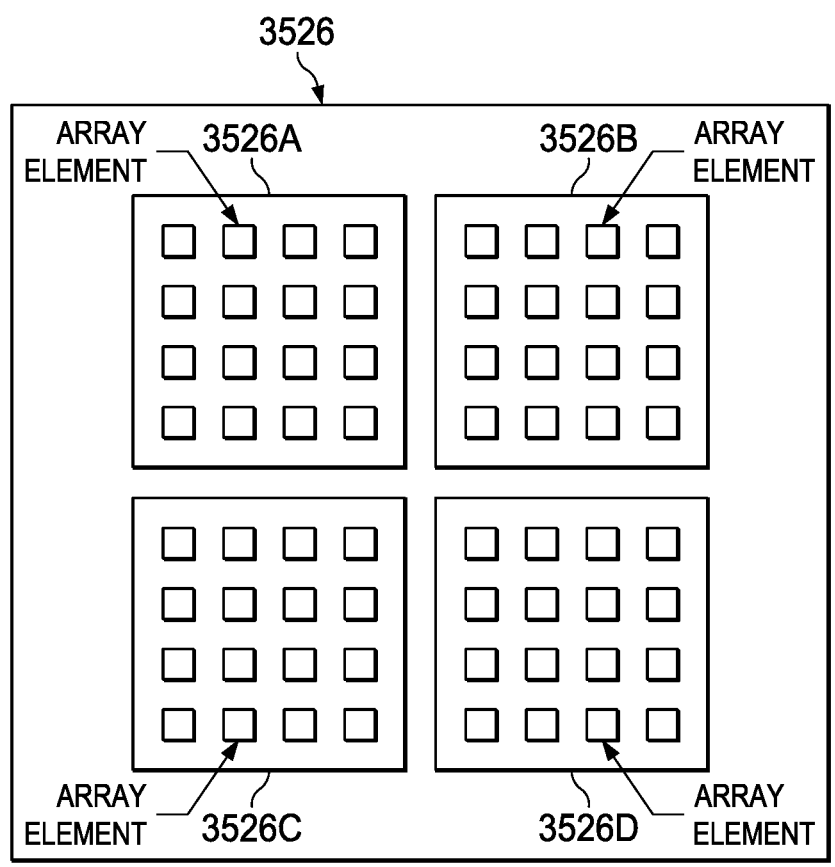
FIG. 35B illustrated an example antenna array in accordance with the present disclosure.

FIG. 35B illustrates an example antenna array 3526 in accordance with the present disclosure. An embodiment of the antenna array 3526 shown in FIG. 35B is for illustration only. One or more of the components illustrated in FIG. 35B can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 35B, the antenna array 3526 includes a set of antenna arrays 3526A, 3526B.

As illustrated in FIG. 24, a frame structure of digital radar waveform is illustrated. A "slot" is composed of cyclic-prefix (CP), multiple OFDM symbols generated by discrete Fourier transform (DFT) spreading of one or multiple CAZAC sequences, and guard time (GT). The GT is added based on a required sequence length, and a range of interest for a target scene.

Multiple sequence periods each comprising OFDM symbol are present in a slot.

Range processing performs correlation processing of the received OFDM symbols relative to the transmitted coded signal, followed by coherent accumulation of OFDM symbols within a slot.

An OFDM symbol length is determined as inverse of sub-carrier spacing, while a slot length is set within a channel coherence time. As an example, for 2GHz RF bandwidth with 500kHz sub-carrier spacing, an FFT size is 4096 points, an OFDM symbol length is 2 μsec, and a channel coherence time is 8 μsec and 16 μsec for velocities 350 kmph and 175 kmph, respectively.

Multiple slots constitute sub-frames that are used for Doppler processing. Each sub-frame signal illuminates targets within its antenna footprint (or beam in scanning radars) resulting in reflection. A complete illumination of the target scene within field-of-view results in a frame. A target scene is scanned multiple times, resulting in frame rate of 10 to 60 frames per second.

Figure 36:
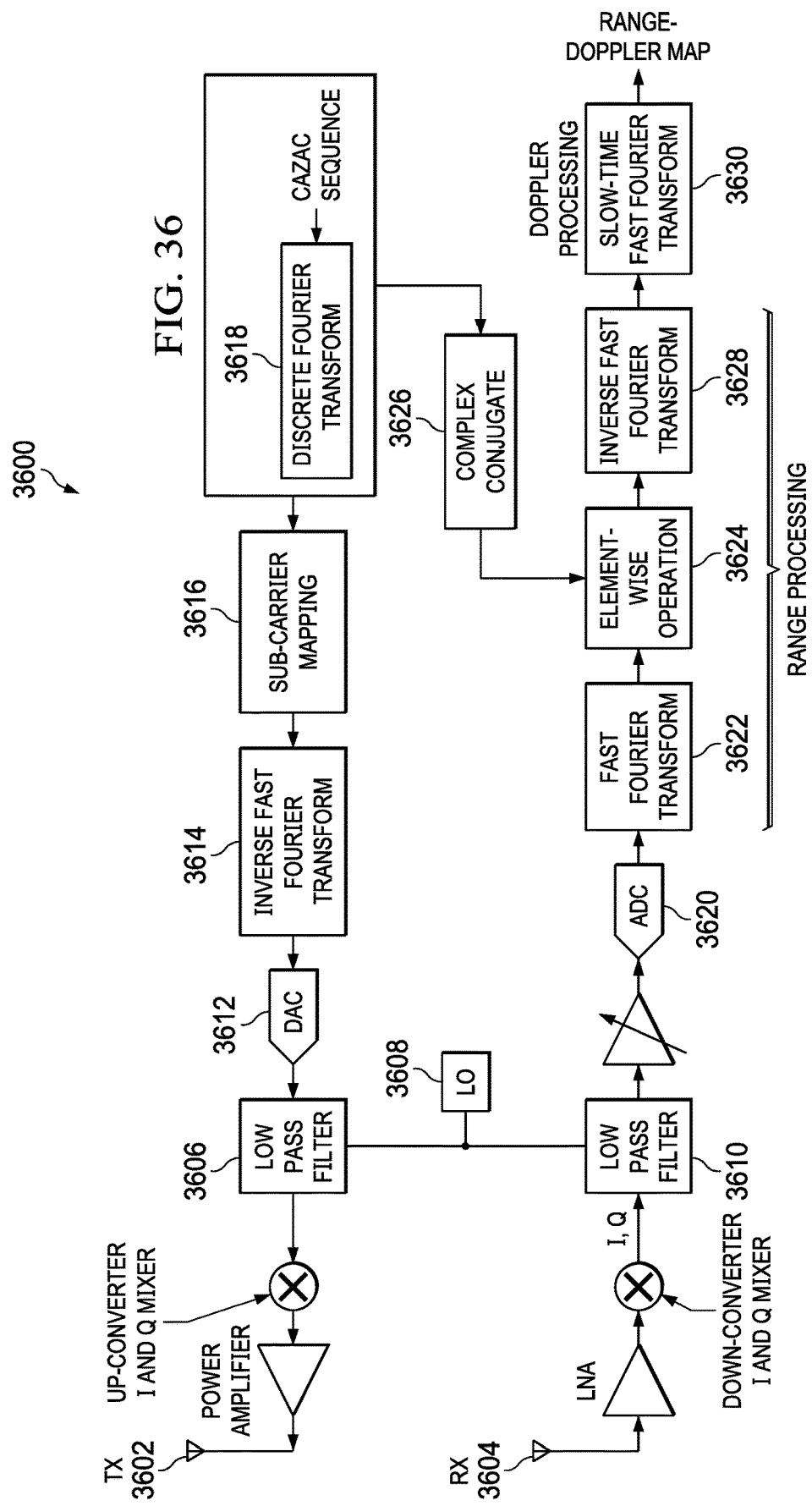
FIG. 36 illustrates an example overall transmit/receiver processing architecture in accordance with the present disclosure.

FIG. 36 illustrates an example overall transmit/receiver processing architecture 3600 in accordance with the present disclosure. An embodiment of the overall transmit/receiver processing architecture 3600 shown in FIG. 36 is for illustration only. One or more of the components illustrated in FIG. 36 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 36, the transmit/receiver processing architecture 3600 may be implemented as an advanced system or the transmit/receiver processing architecture 3600 may be implemented as one of components of the advanced system.

As illustrated in FIG. 36, the transmit/receiver processing architecture 3600 comprises a Tx antenna 3602, a Rx antenna 3604, an LPF 3606, 3610, an LO block 3608, a DAC block 3612, an ADC block 3620, an IFFT block 3614, a FFT block 3622, a sub-carrier mapping block 3616, an element-wise operation block 3624, a DFT block 3618, a complex conjugate block 3626, an IFFT block 3628, and a slow-time FFT block 3630. Transmitter and receiver architecture of DFT-spread OFDM radar waveform is shown in FIG. 36. A CAZAC sequence is transformed to frequency domain signal for DFT. A frequency-domain CAZAC sequence is mapped to a sub-carrier centered around a zero frequency and transformed back to time-domain signal. The DFT-spread radar signal is converted to analog signal and passed to a low pass filter (LPF) and an IQ mixer, a PA and transmitted through the Tx antenna. At a receiver, signals from an Rx antenna is demodulated and filtered, then converted to baseband signal by ADC.

The range processing is achieved in a frequency domain: received baseband signal is converted to a frequency-domain by FFT, multiplied by the complex conjugate of the DFT version of original CAZAC sequence, followed by time-domain conversion by IFFT, which gives the correlation output corresponding to each range bin.

Doppler processing is applied by taking FFT of the correlation output for each range bin, resulting in a 2-dimensional range-Doppler map.

In the implementation, because signal is pre-computed and stored in a memory, thereby real-time processing requirement is reduced significantly.

At a transmitter, a DFT-spread OFDM waveform after IFFT is pre-computed and stored in a memory. For receiver processing, reference signal that is complex conjugate of DFT-spread CAZAC sequence is pre-computed and stored in a memory and used in range-processing. Real-time processing is in a receiver range and Doppler processing. Particularly, the range processing is the most challenging part in digital radars.

Figure 37:
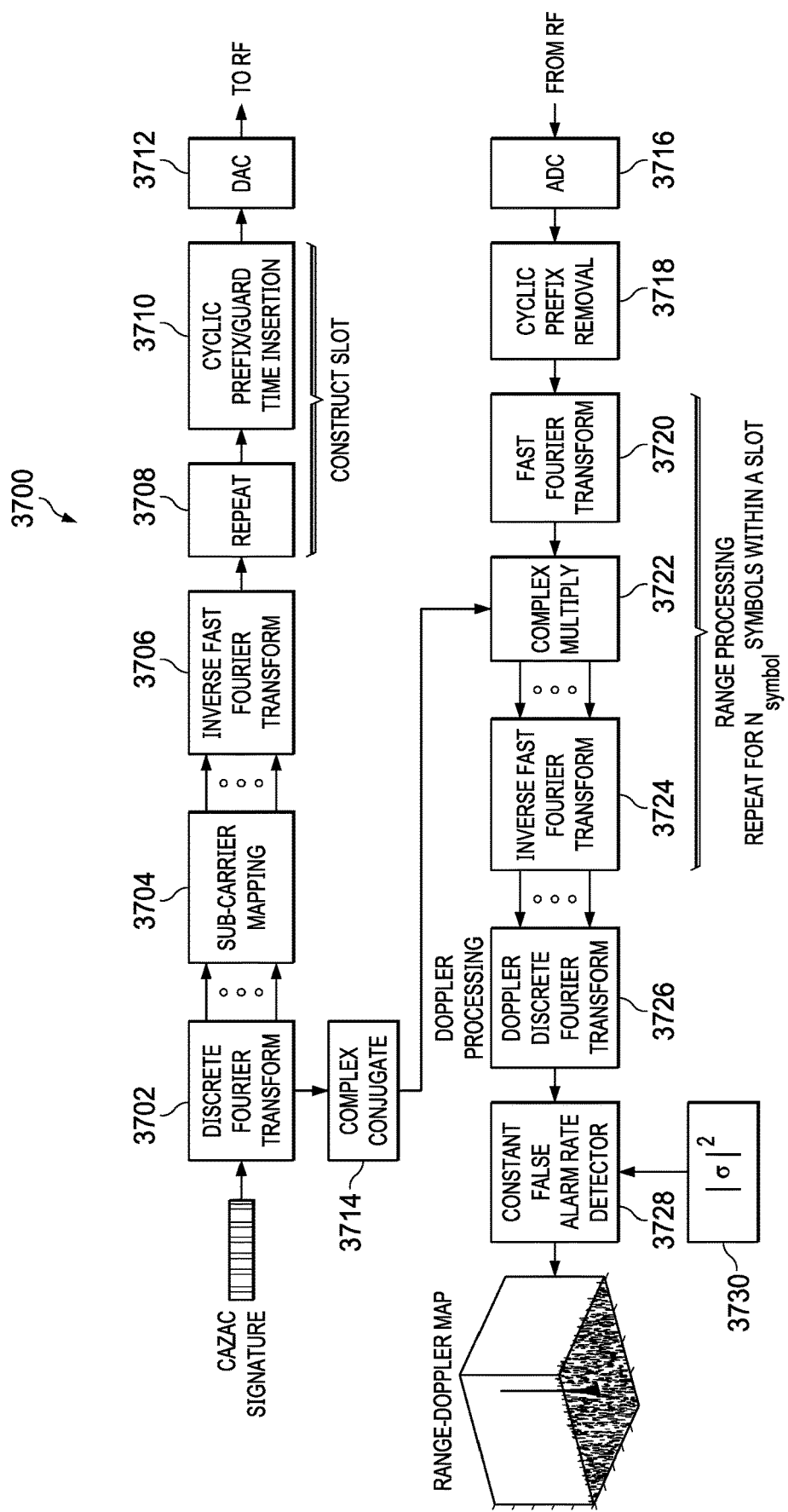
FIG. 37 illustrates an example frequency-domain range-Doppler processing for a radar waveform in accordance with the present disclosure.

FIG. 37 illustrates an example frequency-domain range-Doppler processing for a radar waveform 3700 in accordance with the present disclosure. An embodiment of the frequency-domain range-Doppler processing for a radar waveform 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 37, the frequency-domain range-Doppler processing for a radar waveform 3700 may be implemented as an advanced system or the frequency-domain range-Doppler processing for a radar waveform 3700 may be implemented as one of components of the advanced system.

For OFDM systems, a multiple correlation computation is needed for symbols within a slot. FIG. 37 shows the detailed block diagram of range-Doppler processing of the radar waveform that is provided in the present disclosure.

For automotive radars, sub-carrier spacing is determined by the two-way Doppler of the signal returns. In typical environment, an OFDM symbol length is 2 μsec, and a number of OFDM symbols within a slot is set based on a channel coherence time that can be 4 to 8. An FFT size is 4K and 8K, for an RF bandwidth of 2 GHz and 4 GHz, respectively. With this signal structure, multiple FFT/complex multiplication/IFFT computation is repeated every 2 μsec OFDM symbol. This results in a large gate count and huge power consumption.

As illustrated in FIG. 37, the frequency-domain range-Doppler processing architecture comprises a DFT block 3702, a sub-carrier mapping block 3704, an IFFT block 3706, a repeat block 3708, a CP/GT insertion block 3710, a DAC block 3712, a complex conjugate block 3714, an ADC block 3716, a CP removal block 3718, an FFT block 3720, a complex multiply block 3722, an IFFT block 3724, a Doppler DFT block 3726, a CFAR detector block 3728, and an arithmetic block 3730.

Figure 38:
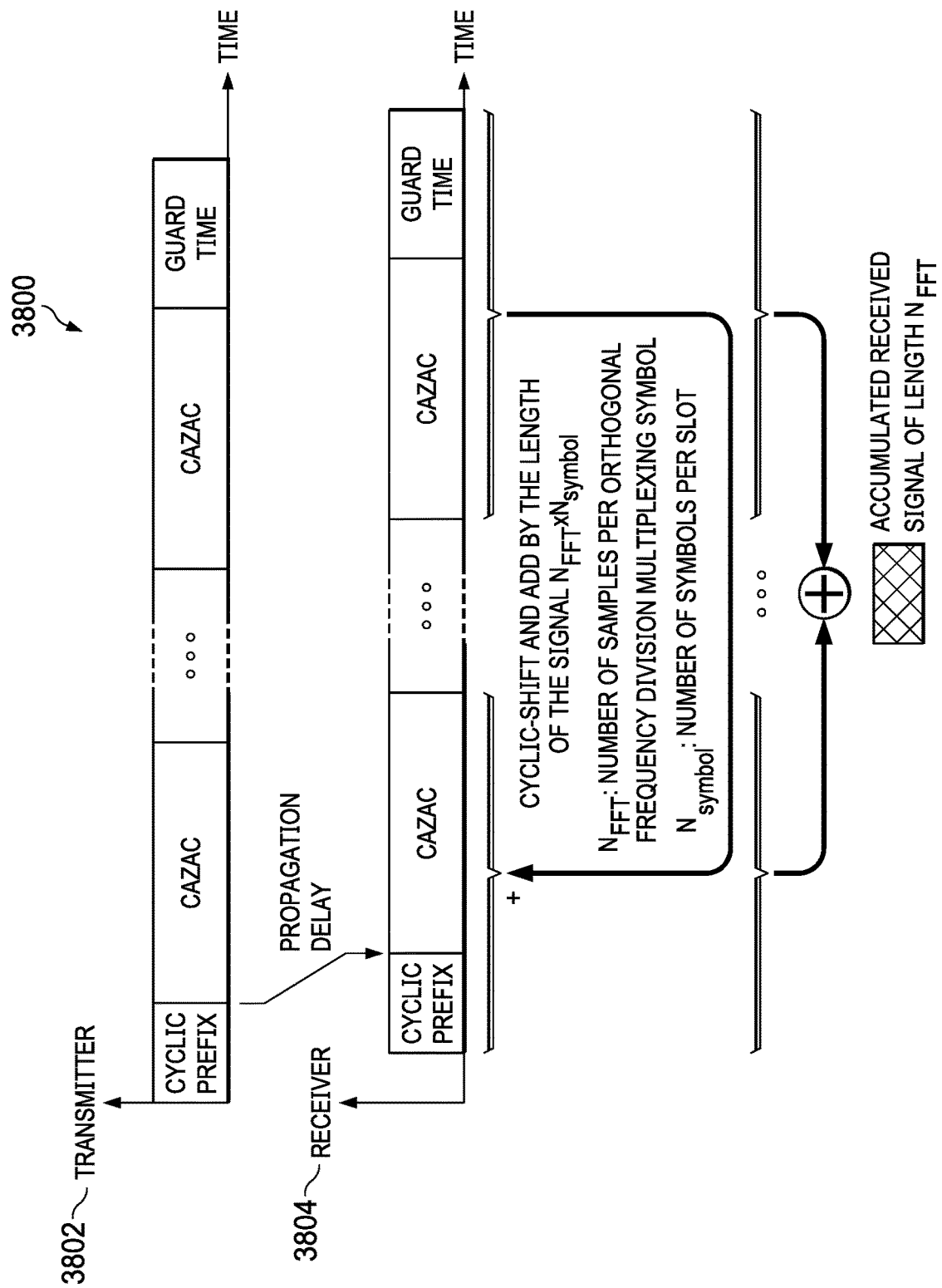
FIG. 38 illustrates an example time-domain representation of compressed range processing of transmitted signal, received signal, cyclic-shift, and add followed by accumulation operation in accordance with the present disclosure.

FIG. 38 illustrates an example time-domain representation 3800 of compressed range processing of transmitted signal, received signal, cyclic-shift, and add followed by accumulation operation in accordance with the present disclosure. An embodiment of the time-domain representation 3800 shown in FIG. 38 is for illustration only. One or more of the components illustrated in FIG. 38 can be implemented in specialized circuitry configured to perform the noted functions or one or more of the components can be implemented by one or more processors executing instructions to perform the noted functions. Other embodiments are used without departing from the scope of the present disclosure.

In one embodiment, exploiting linearity and periodic correlation property of the signal, computationally efficient receiver processing (e.g., compressed range-processing) is provided. FIG. 38 illustrates time-domain signal processing of an OFDM slot in the compressed range-processing.

FIG. 38 shows time-domain representation of compressed range processing of transmitted signal, received signal, cyclic-shift and add followed by accumulation operation. Received signal that falls in GT of a slot is cyclically shifted by the length of the signal ($N_{FFT} \times N_{symbol}$), followed by sample-by-sample accumulation of the OFDM symbols within a slot.

As illustrated in FIG. 38, the transmitter 3802 transmits CAZAC sequences and the receiver 3804 receives the CAZAC sequences.

In such embodiment of step 1, from a baseband receiver, a cyclic prefix is removed from the received signal.

In such embodiment of step 2, the last $N_{FFT}$ samples are taken from the received signal that falls in the guard time.

In such embodiment of step 3, $N_{FFT}$ samples are added to the beginning of the signal.

In such embodiment of step 4, sample-by-sample accumulation of OFDM symbols is within a slot.

In such embodiment of step 5, accumulated symbol-length signal is converted to a frequency-domain by for $N_{FFT}$ range-processing.

Figure 39:
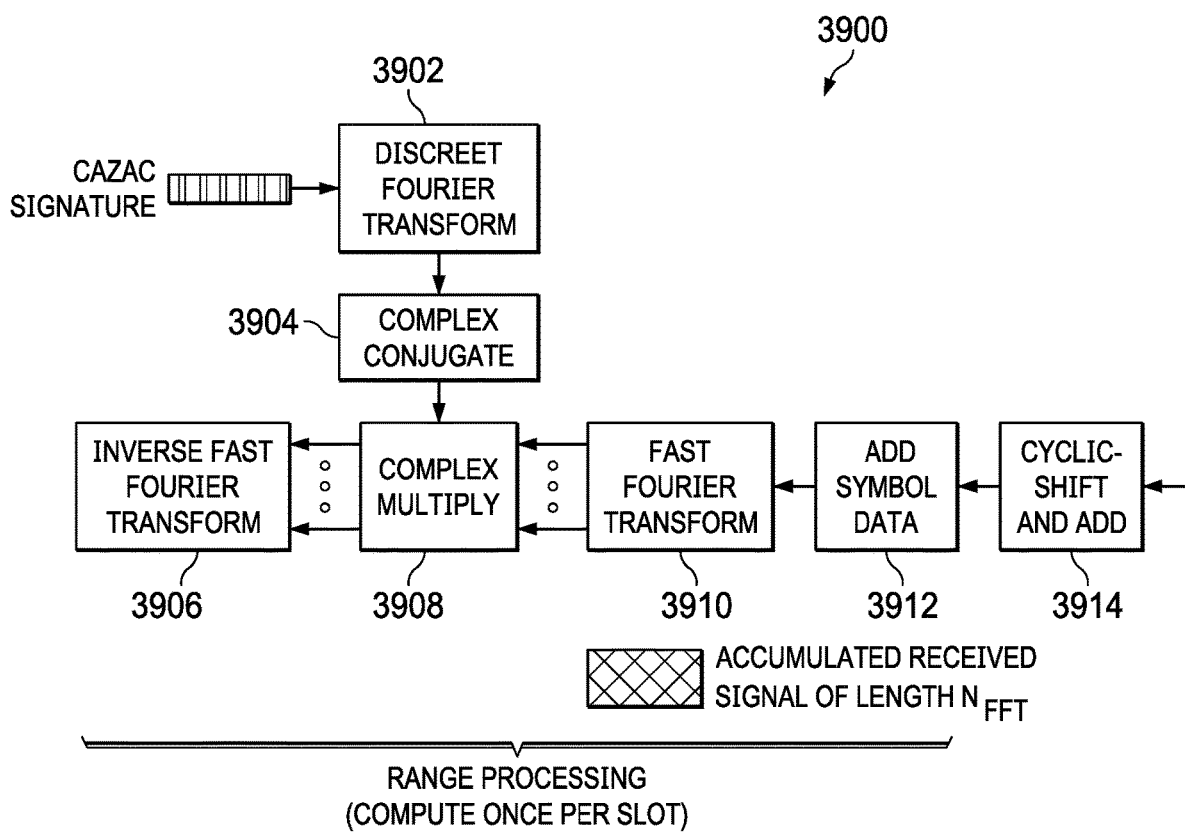
FIG. 39 illustrates an example compressed range-processing for a radar waveform in accordance with the present disclosure.

FIG. 39 illustrates an example compressed range-processing for a radar waveform 3900 in accordance with the present disclosure. An embodiment of the compressed range-processing for a radar waveform 3900 shown in FIG. 39 is for illustration only. One or more of the components illustrated in FIG. 39 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 37, the compressed range-processing for a radar waveform 3900 may be implemented as an advanced system or the compressed range-processing for a radar waveform 3900 may be implemented as one of components of the advanced system.

As illustrated in FIG. 39, the ranging process operation comprises a DFT block 3902, a complex conjugate block 3904, an IFFT block 3906, a complex multiply block 3908, an FFT block 3910, an add symbol data block 3912, and a cyclic-shift, and add block 3914.

Block diagram of the compressed range-processing is shown in FIG. 39.

FIG. 39 shows the compressed range-processing for the radar waveform. Frequency-domain correlation (FFT, complex multiplication followed by IFFT) is computed once per slot instead of once per OFDM Symbol.

In one embodiment, compared with conventional linear frequency-domain correlation, a reduction scheme is provided to reduce the complexity in two ways.

In one embodiment, by compressing multiple OFDM symbols to a single accumulated OFDM symbol, complexity is reduced by $N_{symbol}$ while processing time is extended from $N_{symbol}$.

In one example, 1 frequency-domain correlation (e.g., FFT/complex multiplication/IFFT) is required every 18 μsec, instead of every 2 μsec.

$N_{FFT}$-point FFT/complex multiplication/IFFT is needed instead of $2 \times N_{FFT}$-point FFT processing required in linear correlation.

Figure 40:
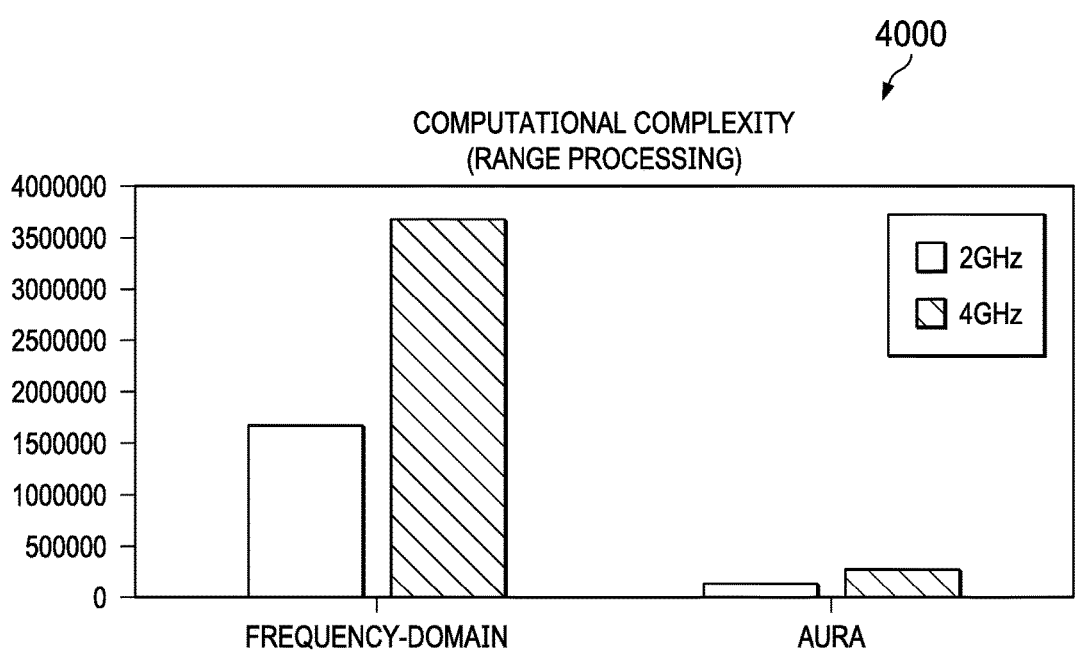
FIG. 40 illustrates an example computational complexity of range processing in accordance with the present disclosure.

FIG. 40 illustrates an example computational complexity of range processing 4000 in accordance with the present disclosure. An embodiment of the computational complexity of range processing 4000 shown in FIG. 40 is for illustration only. One or more of the components illustrated in FIG. 40 can be implemented in specialized circuitry configured to perform the noted functions or one or more of the components can be implemented by one or more processors executing instructions to perform the noted functions. Other embodiments are used without departing from the scope of the present disclosure.

FIG. 40 shows the comparison of computational complexity of conventional frequency-domain range processing and the compressed range-processing that is provided in the present disclosure.

FIG. 40 shows comparison of computational complexity of range processing showing 16-fold reduction in complexity compared with generic frequency-domain approach (Time-domain processing requires 134,217,728 multiplications and 536,870,912 multiplications for range processing of a Slot, requiring 1000× complex multiply-adds compared with the proposed approach.)

TABLE 1 shows system parameters for performance evaluation. The RF bandwidth is assumed to be 2 GHz.

Figure 41:
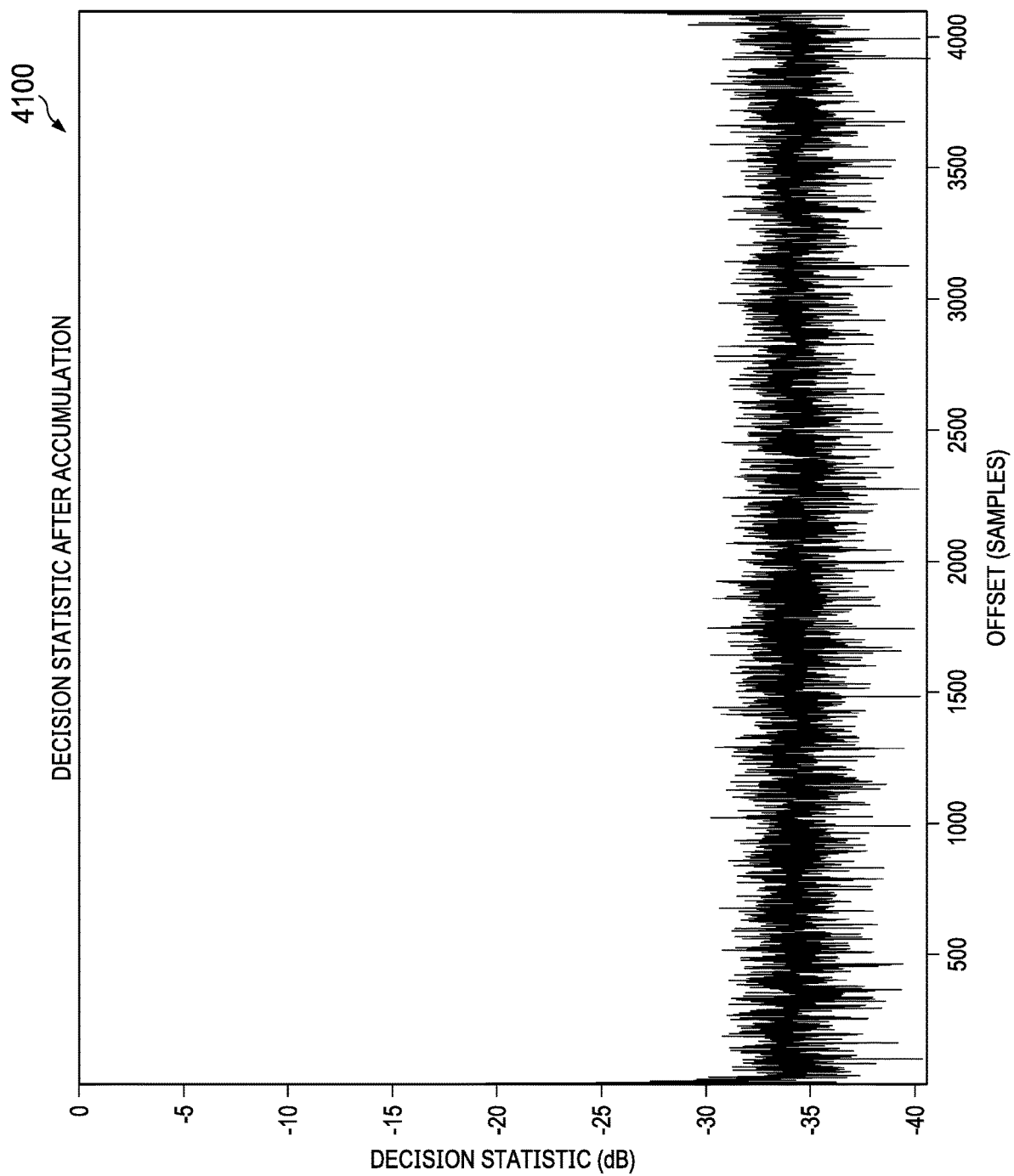
FIG. 41 illustrates an example decision statistic after range-processing for AWGN channel in accordance with the present disclosure.

FIG. 41 illustrates an example decision statistic after range-processing for AWGN channel 4100 in accordance with the present disclosure. An embodiment of the decision statistic after range-processing for AWGN channel 4100 shown in FIG. 41 is for illustration only. One or more of the components illustrated in FIG. 41 can be implemented in specialized circuitry configured to perform the noted functions or one or more of the components can be implemented by one or more processors executing instructions to perform the noted functions. Other embodiments are used without departing from the scope of the present disclosure.

TABLE 1

System parameters for the simulation

| Parameter | Value |
|---|---|
| Carrier Frequency | 79 GHz |
| RF bandwidth | 2 GHz |
| Sub-carrier spacing | 500 kHz |
| FFT size | 4096 |
| Sampling frequency | 2.048 GHz |
| Sampling time | 0.49 ns |
| Sequence length | 3593 |
| Occupied bandwidth | 1.8 GHz |
| Cyclic prefix | 0.5 μs |
| Symbol time | 2 μs |
| Guard time | 2 μs |
| Number of symbols per slot | 8 |
| Number of slots per sub-frame | 256 |
| Unambiguous range | 300 m |
| Max range | 300 m |
| Range resolution | 7.5 cm |
| Max velocity (1-way) | 450 kmph@60 GHz |
| Velocity resolution (Min) | 0.46 m/s |

Figure 42:
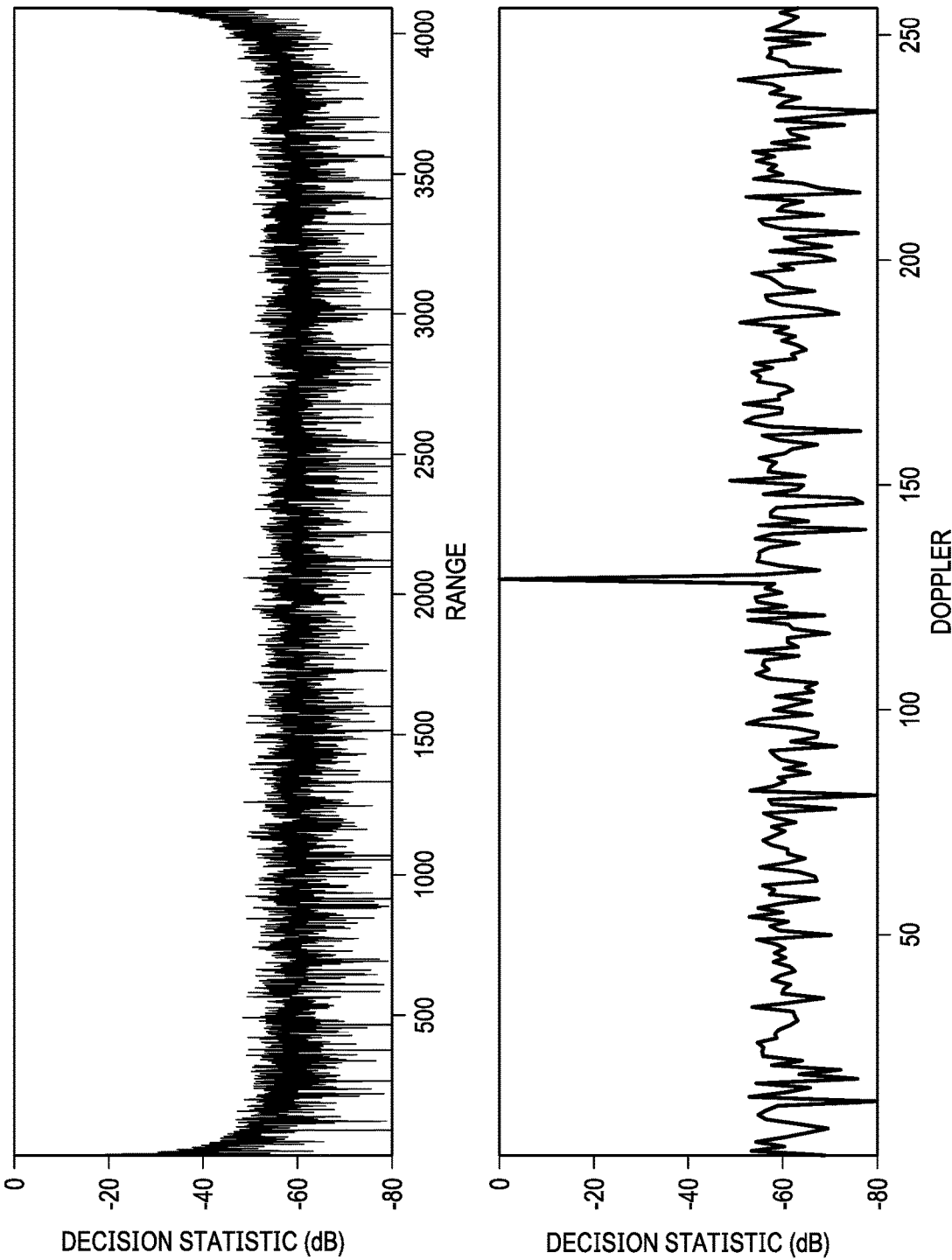
FIG. 42 illustrates an example slice of decision statistic after range-Doppler processing for AWGN channel in accordance with the present disclosure.

FIG. 42 illustrates an example slice of decision statistic after range-Doppler processing for AWGN channel 4200 in accordance with the present disclosure. An embodiment of the slice of decision statistic after range-Doppler processing for AWGN channel 4200 shown in FIG. 42 is for illustration only. One or more of the components illustrated in FIG. 42 can be implemented in specialized circuitry configured to perform the noted functions or one or more of the components can be implemented by one or more processors executing instructions to perform the noted functions. Other embodiments are used without departing from the scope of the present disclosure.

FIG. 42 shows a result after range-processing, computed using the compressed range-processing that is provided in the present disclosure. An average range side-lobe is approximately −34 dB relative to a peak of the signal.

FIG. 42 shows the slices of the signal after range-Doppler processing, following the compressed-range processing algorithm that is provide in the present disclosure. The range slice and Doppler slices are shown in the top and bottom plots. The peak and average range side lobes are approximately −50 dB and −58 dB, respectively. The peak and average Doppler side-lobes are −50 dB and −62 dB, respectively.

Figure 43:
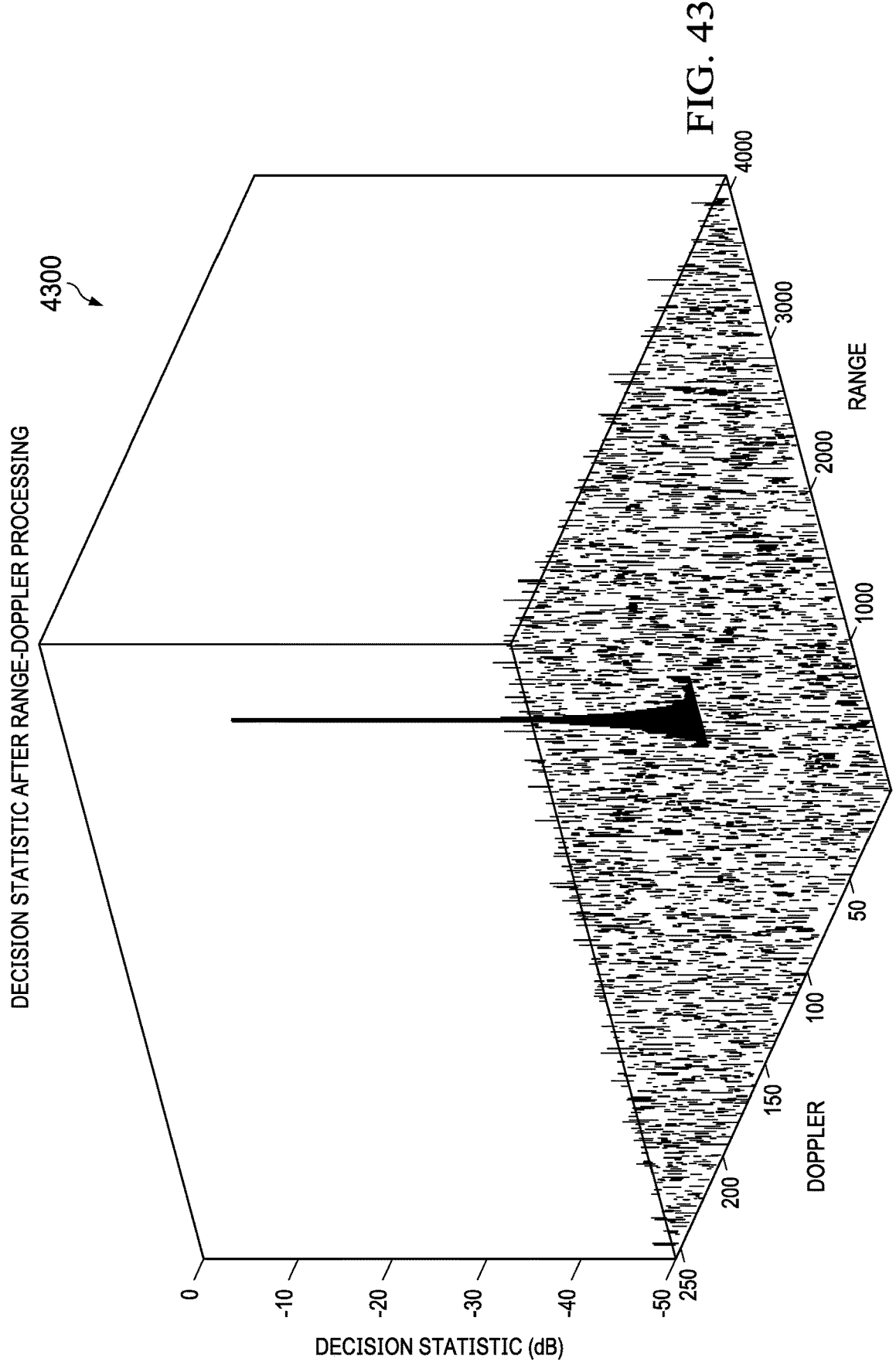
FIG. 43 illustrates an example 2D range-Doppler map after range-Doppler processing in accordance with the present disclosure.

FIG. 43 illustrates an example 2D range-Doppler map after range-Doppler processing 4300 in accordance with the present disclosure. An embodiment of the 2D range-Doppler map after range-Doppler processing 4300 shown in FIG. 43 is for illustration only. One or more of the components illustrated in FIG. 43 can be implemented in specialized circuitry configured to perform the noted functions or one or more of the components can be implemented by one or more processors executing instructions to perform the noted functions. Other embodiments are used without departing from the scope of the present disclosure.

FIG. 43 shows a two-dimensional range-Doppler map after the compressed range-processing followed by Doppler processing, demonstrating a sharp range-Doppler ambiguity function required for high-resolution radars.

The compressed-range processing that is provide in the present disclosure cyclically adds the data from a GT to the first symbol of received signal. Due to the addition, a noise variance of the resulting signal is increased from $N_{symbol} s^2$ to $(N_{symbol}+1) s^2$, where $s^2$ is a noise variance of received complex baseband signal, increasing by $1/N_{symbol}$. For the system parameters analyzed, this is 0.5 dB, resulting in reduction in SINR by 0.5 dB.

In the present disclosure, computationally efficient radar receiver architecture is provided for real-time implementation of an OFDM radar with CAZAC sequence coding. The compressed range-processing that is provide in the present disclosure uses cyclic addition and symbol-accumulation processing, resulting in drastic reduction in complex FFT/complex multiply/IFFT processing for efficient real-time implementation with state-of-art FPGA/DSP hardware or low-power, low-complexity ASIC implementation.

In aforementioned embodiments, the complexity is reduced up to 16-fold compared with state-of-art efficient frequency-domain range-processing algorithms. Compared with time-domain processing from conventional PM radars, the complexity of computation is saved more than 1000 times.

The present disclosure may apply to 4D imaging radars with MIMO and beamforming straight-forward by processing per channel at a receiver. The present disclosure may apply to a time domain radar code such as a PM coded radar as long as underlying PM radar waveform has a similar frame structure and the code possessed cyclic correlation property.

In one embodiment of the present disclosure, the 3-D imaging sensor comprises a transmitter, a receiver, and an array coupled to the transmitter and receiver, said array having one or more energy emitter elements and energy detector elements wherein the array is configured to emit a transmit signal generated by the transmitter.

In such embodiment, the transmit signal comprises a digitally beam formed orthogonal digital waveform modulated by a MIMO processed frequency domain PN sequence, said digitally beam formed orthogonal digital waveform is converted to an analog waveform signal caused to modulate an energy source resulting in a modulated signal (i.e., the modulated energy) analog beam formed to obtain the transmit signal applied to the one or more energy emitter elements of the array.

The receiver is configured to perform operations using computational imaging comprising at least an image formation algorithm to generate 3-D images of a far field scene being illuminated by the 3-D imaging sensor of the present disclosure. The image formation algorithm first makes adjustments to resultant phase shifts experienced by signals transmitted from the 3-D imaging sensor and reflected or backscattered by a far field scene. Further, the image formation algorithm performs a 2-D FFT (Fast Fourier Transform) of the reflectivity density of the reflected signals to generate a 3-D image of the scene from which the transmit signals are reflected or backscattered.

Referring now to FIG. 35, there is shown another embodiment of the present disclosure. Although not shown, the embodiment of FIG. 35 may also be operated, controlled or otherwise directed by a processor in a similar fashion as the embodiment of the present disclosure. That is, the processor controlling of the embodiment of FIG. 35 comprises microprocessors, microcontrollers, a master processor in control of one or a multiple of processors including digital signal processors (DSP), or processors implemented as or are part of field programmable gate arrays (FPGA), application specific integrated circuits (ASICs) or other similar circuitry. Further, the processor may reside on a circuit board that forms part of the image sensor or the processor may be remotely located while still being able to operate, control or otherwise direct any of the modules of FIG. 35.

In the embodiment of FIG. 35, the 3-D imaging sensor 3500 comprises a transmitter (modules 3502 to 3502A inclusive), a receiver (modules 3524B to 3552 inclusive), and an array 3526 coupled to the transmitter and receiver, with said array 3526 having one or more energy emitter elements and energy detector elements wherein the array 3526 is configured to emit a transmit signal generated by the transmitter.

The Array 3526 of FIG. 35 is configured to emit energy in various frequency bands or regions and/or wavelength ranges. For example, the array 3526 of FIG. 35 is configured to emit or detect optical signals in the wavelength range of 700 nm to 1400 nm inclusive belonging to Near Infrared (NIR) and 1400 nm to 3000 nm inclusive belonging to short-wave infrared (SWIR). Also, arrays 3526 are configured to emit or detect electromagnetic signals in one of a high frequency (HF) region or band, a very high frequency (VHF) region, ultra high frequency (UHF), super high frequency (SHF) band, extremely high frequency (EHF) region and a tera hertz (THz) region. The EHF region is particularly suited for simultaneous broad band communications and high-resolution imaging. The term "frequency region" and "frequency band" are used interchangeably.

The front view of array 3526 is shown in FIG. 35 depicting array 3526 comprising four (4) sub-arrays 3526A, 3526B, 3526C, and 3526D. In general, the array 3526 may be subdivided into any number of sub-arrays where each sub-array comprises a certain number of array elements. Each sub-array may have the same number of array energy emitter elements and energy detector elements. Also, certain sub-arrays may have different number of elements depending on the location of said sub-arrays within the entire array. For example, a sub-array located at or near the center of the array may have more array elements than any other sub-arrays.

The transmit signal comprises a digitally beam formed orthogonal digital waveform (output of digital beam former Tx 3516). Prior to being digitally beam formed, the orthogonal digital waveform is generated by the combination of resource element (RE) mapping modules $3512_1, \ldots, 3512_L$ coupled to corresponding inverse fast Fourier transform (IFFT) cyclic prefix (CP) modules $3514_1, \ldots, 3514_L$. Also, said orthogonal digital waveform is modulated by a multiple input multiple output (MIMO) processed frequency domain pseudo noise (PN) sequence (output of MIMO pre-coding module 3510). Thus, the digitally beam formed orthogonal digital waveform is obtained by applying the orthogonal digital waveform to the digital beam former 3516.

The digitally beam formed orthogonal digital waveform is converted to an analog waveform by DAC 3518 (i.e., signal at output of DAC 3518). The resulting analog waveform is applied to an input of modulator 3522 module to modulate an energy source 3520 resulting in a modulated analog signal that is analog beam formed by Beam Former 3524A to obtain the transmit signal (output of Analog Beam Former 3524A) applied to the one or more energy emitter elements of the Array. The one or more energy emitter elements of the Array 3526 emit the transmit signals applied to them.

The modulator 3522 of FIG. 35 may be configured as any one of the following: binary phase shift keying (BPSK) modulator, quadrature phase shift keying (QPSK) modulator, on off keying (OOK) modulator, amplitude shift keying (ASK) modulator, frequency shift keying (FSK) modulator, pulse position modulation (PPM), phase shift keying (PSK) modulator, and differential phase shift keying (DPSK) modulator.

Still referring to FIG. 35, the manufacture of the transmit signal starts with PN sequence generator 3502, which generates a time domain PN sequence: $S_0, S_1, S_2, \ldots S_{N-1}$, which is transformed via discrete Fourier transform (DFT) module 3504 to a frequency domain PN sequence: $X_0, X_1, X_2, \ldots, X_{N-1}$ as shown in FIG. 35.

The DFT module 3504 is a circuit or module that performs a Discrete Fourier Transform on a time domain sequence to convert said sequence to a frequency domain sequence. A time domain PN sequence obtained from a CAZAC sequence is one example of a PN sequence $$x_u(n) = e^{-j\frac{\pi u n(n+1)}{N_{ZC}}}, 0 \le n \le N_{ZC} - 1$$

Figure 44:
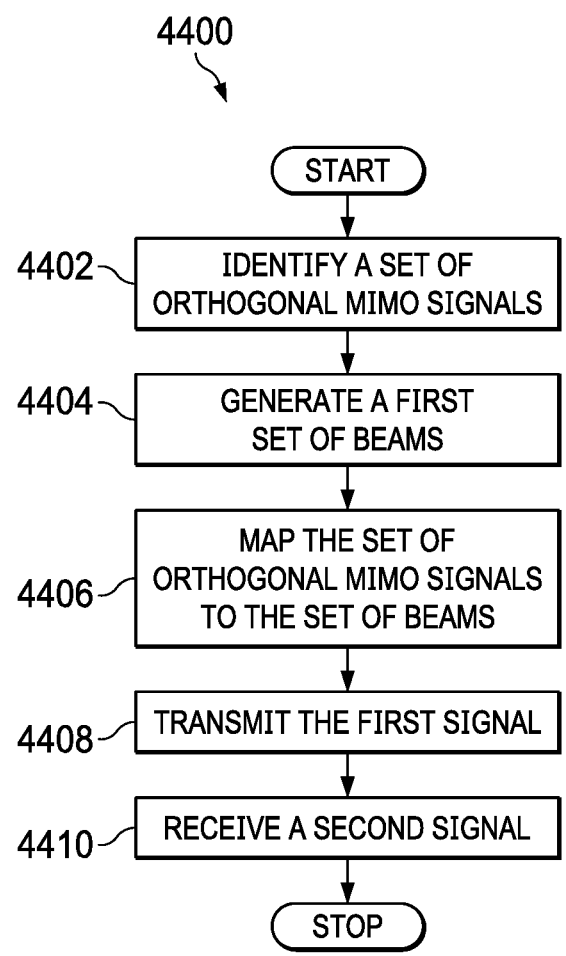
FIG. 44 illustrates a flow chart of a method for multi-stream MIMO/Beamforming radar in accordance with the present disclosure.

FIG. 44 illustrates a flow chart of a method 4400 for multi-stream MIMO/Beamforming radar in accordance with the present disclosure, as may be performed by an advanced system (e.g., 101-103 and/or 111-116 as illustrated in FIG. 1). An embodiment of the method 4400 shown in FIG. 44 is for illustration only. One or more of the components illustrated in FIG. 44 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 44, the method 4400 begins at step 4402. In step 4402, the advanced system identifies a set of orthogonal multiple-input-multiple-output (MIMO) signals.

Subsequently, in step 4404, the advanced system generates a first set of beams.

Subsequently, in step 4406, the advanced system maps the set of orthogonal MIMO signals into each of the generated set of beams.

Next, in step 4408 the advanced system transmits, to a target scene, a first signal based on the first set of beams.

Finally, in step 4410, the advanced system receives a second signal based on a second set of beams that is reflected or backscattered from the target scene.

In one embodiment, the advanced system generates the set of orthogonal MIMO signals including a set of CAZAC sequences based on a set of cyclically shifted CAZAC sequences.

In one embodiment, the advanced system generates the set of orthogonal MIMO signals including a set of MIMO coded signals based on a set of different root CAZAC sequences.

In one embodiment, the advanced system identifies a set of reference signal candidates and calculate a correlation for the set of reference signal candidate.

In one embodiment, the advanced system illuminates, using the set of orthogonal MIMO signals, an entire scene with a same transmit beam of the first set of beams.

In one embodiment, the advanced system identifies signal using range/Doppler process that is computed for the set of orthogonal MIMO signals and performs a spatial process for the identified signal to generate an image.

In one embodiment, the advanced system identifies, based on a targeted range, an operation mode comprising a MIMO operation mode, a hybrid of MIMO and beamforming operation mode, or a beamforming operation mode, transmits, the first signal based on the identified operation mode, and receives, the second signal based on the identified operation mode.

In one embodiment, the advanced system constructs a signal corresponding to an OFDM radar waveform repeating a set of orthogonal frequency division multiplexing (OFDM) symbols; accumulates, in a slot, the set of OFDM symbols using a same code over multiple symbols of the set of OFDM symbols; generates combined signals based on the accumulated set of OFDM symbols; and computes a range correlation for the generated combined signals.

In such embodiment, the advanced system computes the range correlation based on: calculating FFT of the combined signal; computing a complex multiplication of the combined signal and a reference signal; and computing an IFFT of the computed complex multiplicated combined signal to obtain a range correlation.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An advanced system, the advanced system comprising:
   a set of antennas including a set of transmit antennas and a set of receive antennas;
   a digital beamformer;
   a processor operably connected to the set of antennas and the digital beamformer, the processor configured to:
   identify a set of orthogonal multiple-input-multiple-output (MIMO) signals,
   generate a first set of beams via the digital beamformer, and
   map the set of orthogonal MIMO signals into each of the generated set of beams, and
   a transceiver operably connected to the processor, the transceiver configured to:
   transmit, to a target scene via the set of transmit antenna of the set of antennas, a first signal based on the first set of beams;
   illuminate, using the set of orthogonal MIMO signals, the target scene with a same transmit beam of the first set of beams; and receive, via the set of receive antennas of the set of antennas, a second signal based on a second set of beams that is reflected or backscattered from the target scene.

2. The advanced system of claim 1, wherein the processor is further configured to generate the set of orthogonal MIMO signals including a set of constant amplitude zero autocorrelation waveform (CAZAC) sequences based on a set of cyclically shifted CAZAC sequences.

3. The advanced system of claim 1, wherein the processor is further configured to generate the set of orthogonal MIMO signals including a set of MIMO coded signals based on a set of different root constant amplitude zero autocorrelation waveform (CAZAC) sequences.

4. The advanced system of claim 1, wherein the processor is further configured to:
identify a set of reference signal candidates; and
calculate a correlation for the set of reference signal candidate.

5. The advanced system of claim 1, wherein the processor is further configured to:
identify signal using range/Doppler process that is computed for the set of orthogonal MIMO signals; and
perform a spatial process for the identified signal to generate an image.

6. The advanced system of claim 1, wherein the processor is further configured to:
identify, based on a targeted range, an operation mode comprising a MIMO operation mode, a hybrid of MIMO and beamforming operation mode, or a beamforming operation mode;
transmit, the first signal based on the identified operation mode; and
receive, the second signal based on the identified operation mode.

7. The advanced system of claim 1, wherein the processor is further configured to:
construct a signal corresponding to an orthogonal frequency division multiplexing (OFDM) radar waveform repeating a set of OFDM symbols;
accumulate, in a slot, the set of OFDM symbols using a same code over multiple symbols of the set of OFDM symbols;
generate combined signals based on the accumulated set of OFDM symbols; and
compute a range correlation for the generated combined signals based on:
calculating fast Fourier transform (FFT) of the combined signal;
computing a complex multiplication of the combined signal and a reference signal; and
computing an IFFT of the computed complex multiplicated combined signal to obtain a range correlation.

8. A method of an advanced system, the method comprising:
identifying a set of orthogonal multiple-input-multiple-output (MIMO) signals;
generating a first set of beams;
mapping the set of orthogonal MIMO signals into each of the generated set of beams;
transmitting, to a target scene, a first signal based on the first set of beams;
illuminating, using the set of orthogonal MIMO signals, the target scene with a same transmit beam of the first set of beams; and
receiving a second signal based on a second set of beams that is reflected or backscattered from the target scene.

9. The method of claim 8, further comprising generating the set of orthogonal MIMO signals including a set of constant amplitude zero autocorrelation waveform (CAZAC) sequences based on a set of cyclically shifted CAZAC sequences.

10. The method of claim 8, further comprising generating the set of orthogonal MIMO signals including a set of MIMO coded signals based on a set of different root constant amplitude zero autocorrelation waveform (CAZAC) sequences.

11. The method of claim 8, further comprising:
identify a set of reference signal candidates; and
calculate a correlation for the set of reference signal candidate.

12. The method of claim 8, further comprising:
identifying signal using range/Doppler process that is computed for the set of orthogonal MIMO signals; and
performing a spatial process for the identified signal to generate an image.

13. The method of claim 8, further comprising:
identifying, based on a targeted range, an operation mode comprising a MIMO operation mode, a hybrid of MIMO and beamforming operation mode, or a beamforming operation mode;
transmitting, the first signal based on the identified operation mode; and
receiving, the second signal based on the identified operation mode.

14. The method of claim 8, further comprising:
constructing a signal corresponding to an orthogonal frequency division multiplexing (OFDM) radar waveform repeating a set of OFDM symbols;
accumulating, in a slot, the set of OFDM symbols using a same code over multiple symbols of the set of OFDM symbols;
generating combined signals based on the accumulated set of OFDM symbols; and
computing a range correlation for the generated combined signals based on:
calculating fast Fourier transform (FFT) of the combined signal;
computing a complex multiplication of the combined signal and a reference signal; and
computing an IFFT of the computed complex multiplicated combined signal to obtain a range correlation.

15. A non-transitory computer-readable medium comprising program code, that when executed by at least one processor, causes an advanced system to:
identify a set of orthogonal multiple-input-multiple-output (MIMO) signals;
generate a first set of beams;
map the set of orthogonal MIMO signals into each of the generated set of beams;
transmit, to a target scene, a first signal based on the first set of beams;
illuminate, using the set of orthogonal MIMO signals, the target scene with a same transmit beam of the first set of beams; and
receive a second signal based on a second set of beams that is reflected or backscattered from the target scene.

16. The non-transitory computer-readable medium of claim 15, further comprising program code, that when executed by at least one processor, causes the advanced system to:

generate the set of orthogonal MIMO signals including a set of constant amplitude zero autocorrelation waveform (CAZAC) sequences based on a set of cyclically shifted CAZAC sequences; and generate the set of orthogonal MIMO signals including a set of MIMO coded signals based on a set of different root CAZAC sequences.

17. The non-transitory computer-readable medium of claim 15, further comprising program code, that when executed by at least one processor, causes the advanced system to:

identify a set of reference signal candidates;

calculate a correlation for the set of reference signal candidate;

identify signal using range/Doppler process that is computed for the set of orthogonal MIMO signals;

perform a spatial process for the identified signal to generate an image;

identify, based on a targeted range, an operation mode comprising a MIMO operation mode, a hybrid of MIMO and beamforming operation mode, or a beamforming operation mode;

transmit, the first signal based on the identified operation mode; and receive, the second signal based on the identified operation mode.

18. The non-transitory computer-readable medium of claim 15, further comprising program code, that when executed by at least one processor, causes the advanced system to:

construct a signal corresponding to an OFDM radar waveform repeating a set of orthogonal frequency division multiplexing (OFDM) symbols;

accumulate, in a slot, the set of OFDM symbols using a same code over multiple symbols of the set of OFDM symbols;

generate combined signals based on the accumulated set of OFDM symbols; and compute a range correlation for the generated combined signals based on:

calculating fast Fourier transform (FFT) of the combined signal;

computing a complex multiplication of the combined signal and a reference signal; and computing an IFFT of the computed complex multiplicated combined signal to obtain a range correlation.

* * * * *